(12) United States Patent
Shimada et al.

(10) Patent No.: US 6,285,724 B1
(45) Date of Patent: Sep. 4, 2001

(54) RECEIVING APPARATUS FOR DECODING SERIAL SIGNAL INTO INFORMATION SIGNAL AND COMMUNICATION SYSTEM WITH THE RECEIVING APPARATUS

(75) Inventors: Takashi Shimada; Yasunori Taniguchi, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/520,282

(22) Filed: Mar. 6, 2000

(30) Foreign Application Priority Data

Aug. 31, 1999 (JP) .................................... 11-244959

(51) Int. Cl.$^7$ ...................................... H04L 7/00
(52) U.S. Cl. .......................................... 375/363; 370/509
(58) Field of Search ..................... 375/368, 362, 375/363, 364, 365, 366; 370/503, 509, 511, 514, 491; 327/263, 182, 183, 261

(56) References Cited

U.S. PATENT DOCUMENTS 5,073,733 * 12/1991 Tanno et al. .......................... 327/261
5,127,027 * 6/1992 Takahashi ............................. 375/362
5,519,730 * 5/1996 Jasper et al. .......................... 375/260
5,602,835 * 2/1997 Seki et al. ............................. 370/206

FOREIGN PATENT DOCUMENTS

| A5842336 | 3/1983 | (JP) . |
| 6152576 | 5/1994 | (JP) . |
| A7288516 | 10/1995 | (JP) . |

* cited by examiner

*Primary Examiner*—Chi Pham
*Assistant Examiner*—Phuong Phu

(57) ABSTRACT

A receiving apparatus is provided for receiving a serial signal composed of a sequence of signals transmitted through a transmission medium. In the receiving apparatus, a receiving circuit receives as a received signal a serial signal, which is a sequence of signals including at least one of a synchronizing signal and an information signal, and which includes a plurality of signals being the same as each other and being apart from each other by a predetermined time interval. Then, a delaying circuit generates a delayed signal by delaying the received signal by the predetermined time interval, and a multiplying circuit generates a multiplied signal by multiplying the received signal by the delayed signal. Finally, a detecting circuit detects at least one of the synchronizing signal and the information signal, based on the multiplied signal.

14 Claims, 16 Drawing Sheets

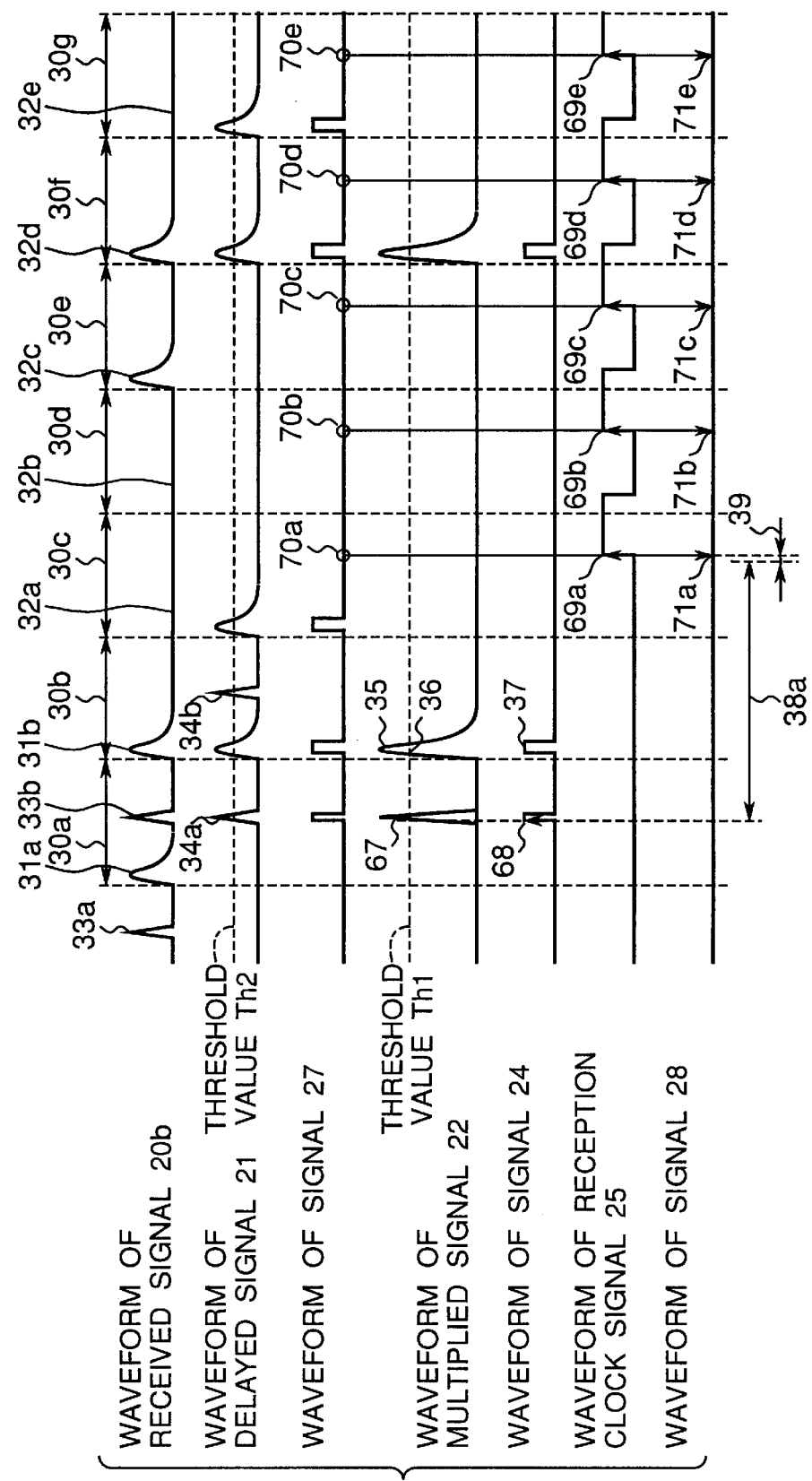

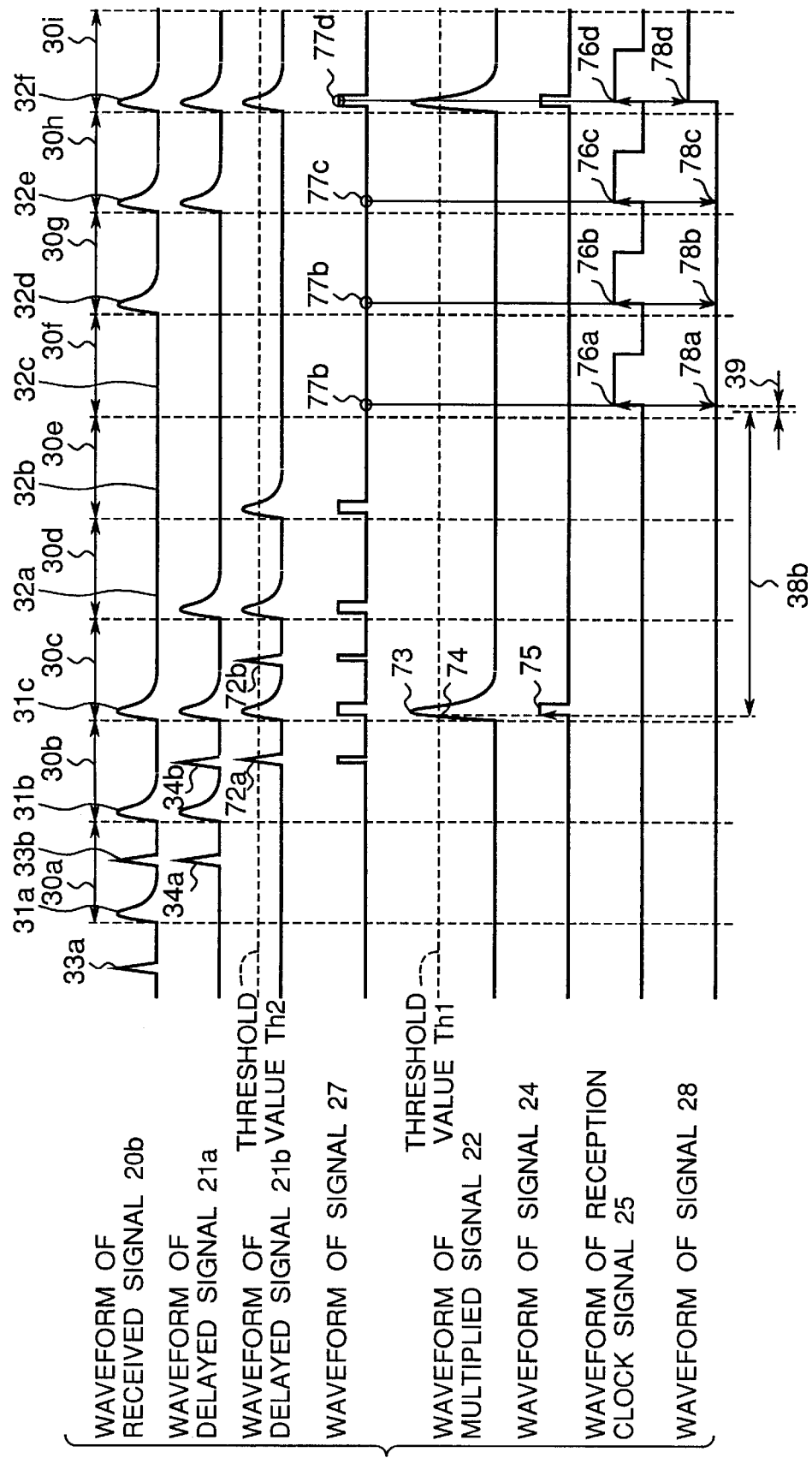

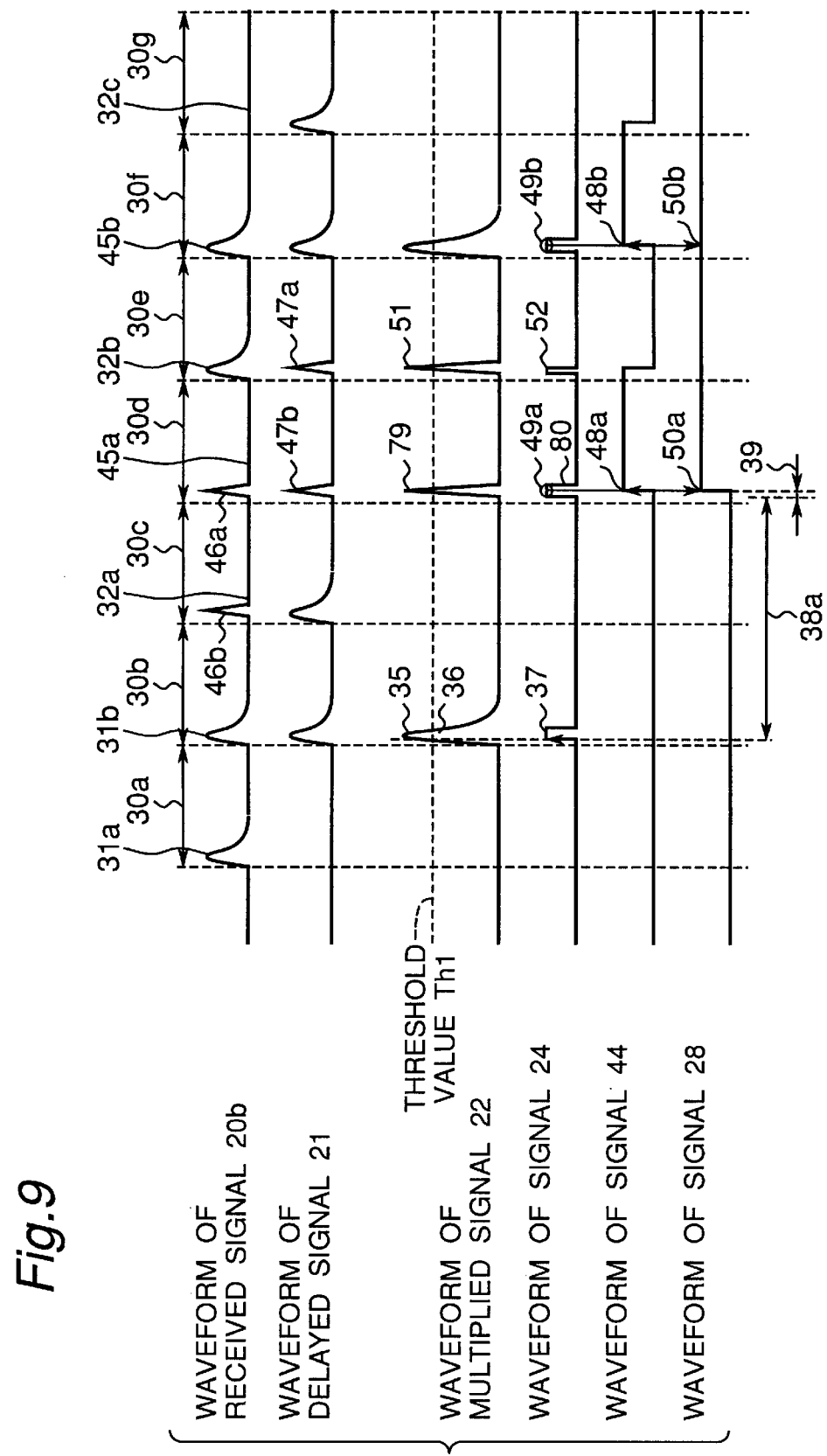

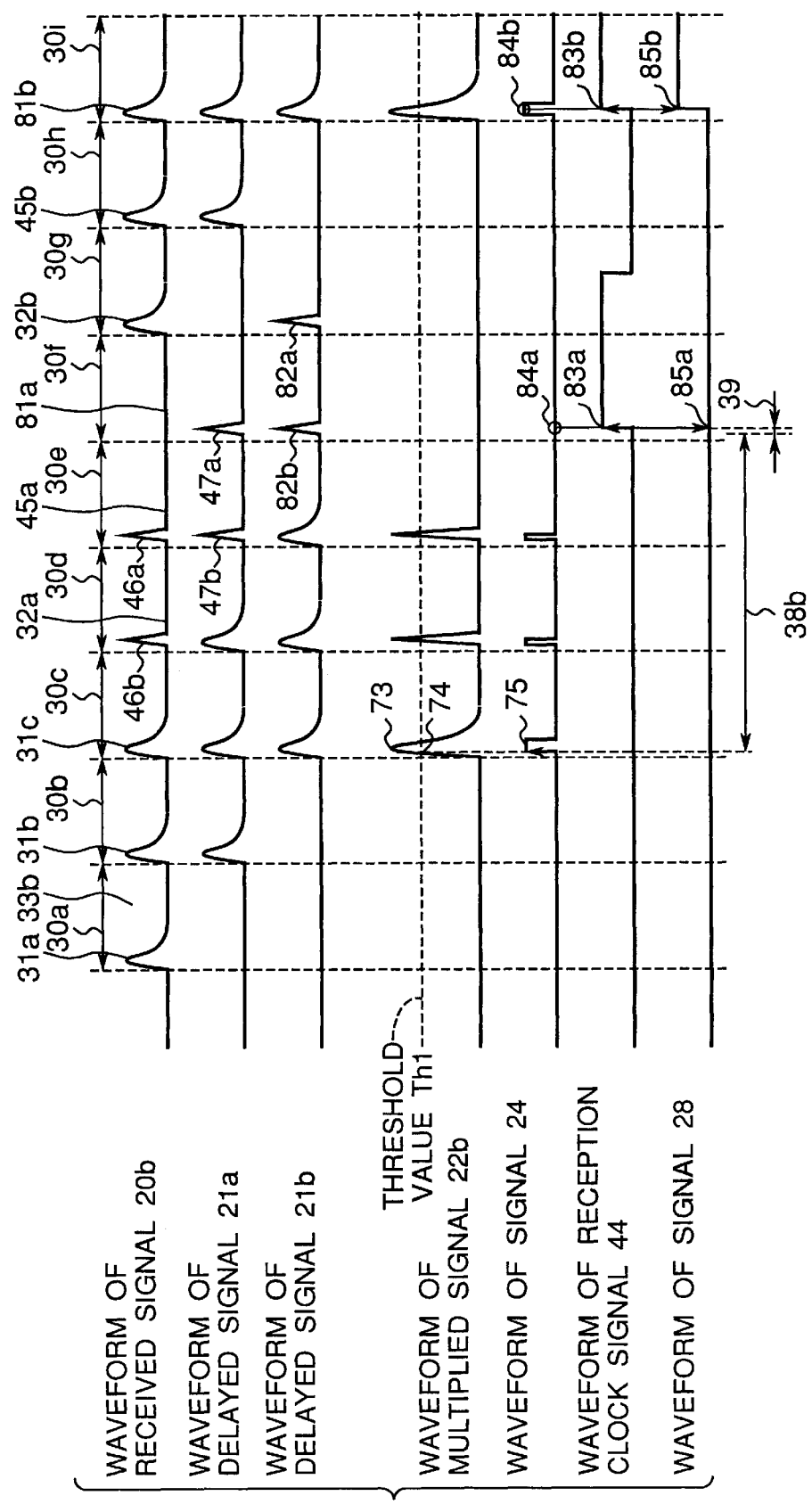

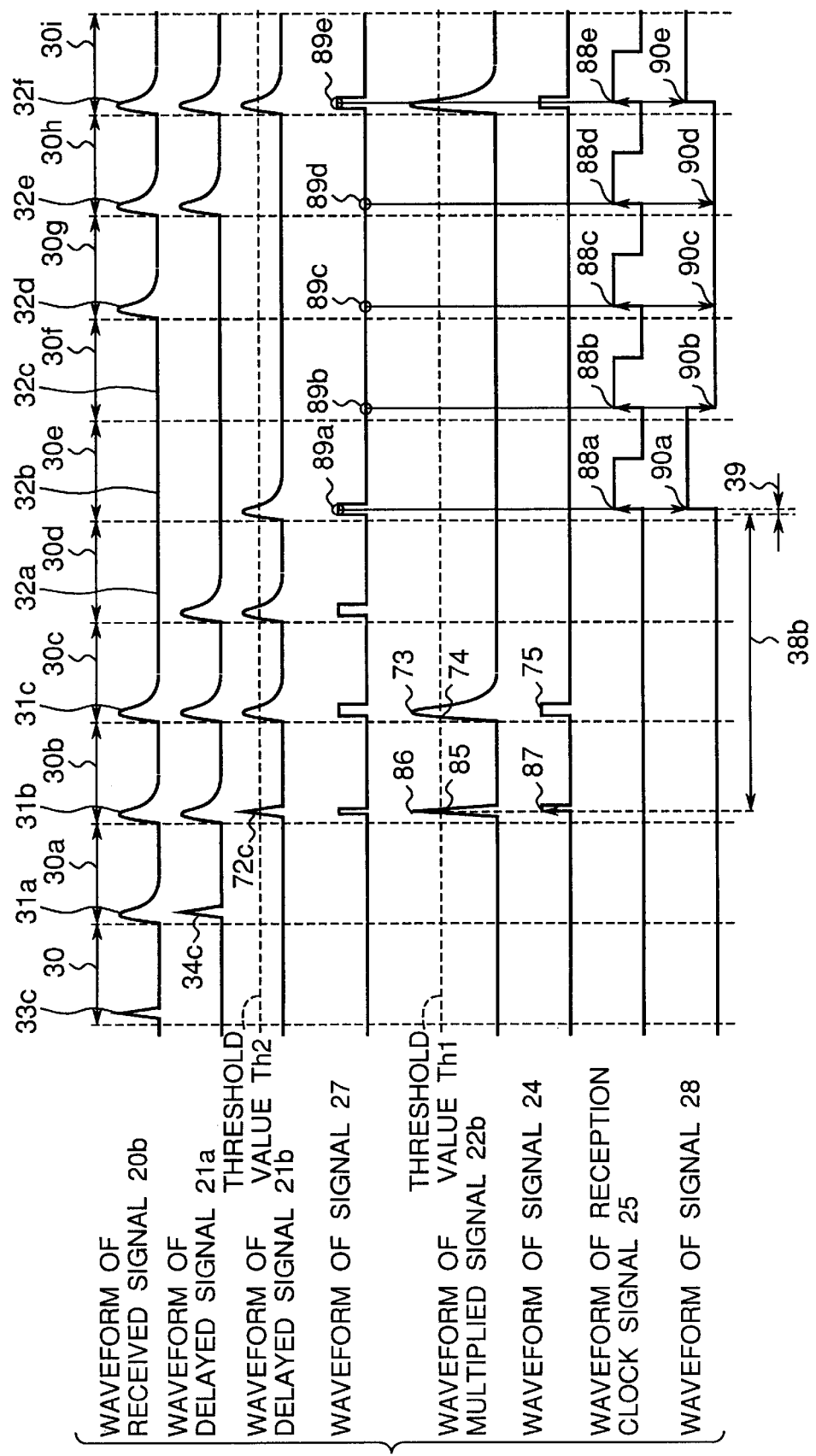

RECEIVING APPARATUS FOR DECODING SERIAL SIGNAL INTO INFORMATION SIGNAL AND COMMUNICATION SYSTEM WITH THE RECEIVING APPARATUS

BACKGROUND OF THE INVENTION

1. Field of the Invention

The present invention relates to a receiving apparatus and a communication system for receiving a serial signal and decoding the received serial signal into an information signal including information data. More specifically, the present invention relates to a receiving apparatus and a communication system capable of decoding a received serial signal into an information signal including information data even if noise is included in the received serial signal.

2. Description of the Related Art

In a serial data transmission method in which a plurality of information bits are transmitted serially, the following so-called start stop synchronization method is used. In this method, transmission is made asynchronously so that a start bit and a stop bit are added respectively before and after data for identification of the beginning and the end of a frame, and then, the start bit is detected at a receiving station for frame synchronization.

According to the above-mentioned prior art serial data transmission method, if a noise signal (pulse) is included before the start bit, it is such a possibility that the noise signal (pulse) may be detected as the start bit. Further, if the noise signal (pulse) is included within the data, it is such a possibility that the noise signal (pulse) may be detected as valid data.

Attempts have been made in order to avoid the above-mentioned problems, and the following method. for receiving serial data is disclosed in Japanese Patent Laid-Open Publication No. 6-152576. If noise is expected in a received signal, a signal having a pulse width not greater than a predetermined pulse width are eliminated as a noise signal from the received signal so that the noise will not cause any detection error, thus a noise signal is eliminated from the received signal, and frame-synchronized data is obtained based on the noise-eliminated signal.

In addition, a method for correcting a bit drop or the like from a run-in signal is disclosed in Japanese Patent Laid-Open Publication No. 58-42336.

The above-mentioned prior art receiving apparatus has the following problems. With the arrangements described above, the prior art receiving apparatus cannot remove a noise signal (pulse) if the noise signal (pulse) has a width similar to that of the valid signal. Therefore, if a noise signal (pulse) having a pulse width similar to that of the synchronizing signal exists near the synchronizing signal, the noise signal (pulse) may be detected as a start pulse. Further, if a noise signal (pulse) having a pulse width similar to that of the data signal exists in the data, the noise pulse may be detected as a valid data signal.

In order to prevent such an error detection, there is such an idea of increasing the pulse width of the synchronizing signal or the data signal. In this case, the increased pulse width of the synchronizing signal or of the data signal decreases transmission speed or the amount of data transmittable within a given time interval.

SUMMARY OF THE INVENTION

An essential object of the present invention is therefore to provide a communication system and a receiving apparatus for the communication system, each of which is capable of performing correct detection of the synchronizing signal or correct decoding the information signal (data signal) even with presence of the noise signal, without significant decrease in the transmission speed.

In order to achieve the aforementioned objective, according to one aspect of the present invention, there is provided a receiving apparatus for receiving a serial signal composed of a sequence of signals transmitted through a transmission medium, comprising:

a receiving circuit for receiving as a received signal a serial signal, which is a sequence of signals including at least one of a synchronizing signal and an information signal, and which includes a plurality of signals being the same as each other and being apart from each other by a predetermined time interval;

a delaying circuit for generates a delayed signal by delaying the received signal received by the receiving circuit by the predetermined time interval;

a multiplying circuit for generating a multiplied signal by multiplying the received signal by the delayed signal; and a detecting circuit for detecting at least one of the synchronizing signal and the information signal, based on the multiplied signal.

In the above-mentioned receiving apparatus, each of the plurality of signals is preferably the synchronizing signal, and the detecting circuit detects the synchronizing signal based on the multiplied signal.

In the above-mentioned receiving apparatus, the detecting circuit preferably detects the information signal from the received signal, based on the detected synchronizing signal.

In the above-mentioned receiving apparatus, each of the plurality of signals is preferably the information signal, and the detecting circuit detects the information signal based on the multiplied signal.

In the above-mentioned receiving apparatus, the plurality of signals preferably include first, second and third signals being the same as each other and being apart from each other by predetermined time intervals. The delaying circuit generates a first delayed signal by delaying the received signal by a time interval equal to a time interval between the first and third signals, and generates a second delayed signal by delaying the received signal by a time interval equal to a time interval between the second and third signals. The multiplying circuit generates a multiplied signal by multiplying the first and second delayed signals by the received signal.

In the above-mentioned receiving apparatus, each of the first signal, the second signal and the third signal is preferably the synchronizing signal, and the detecting circuit detects the synchronizing signal based on the multiplied signal.

In the above-mentioned receiving apparatus, the detecting circuit preferably detects the information signal from the received signal, based on the detected synchronizing signal.

In the above-mentioned receiving apparatus, the time interval between the first and second signals is preferably different from the time interval between the second and third signals.

In the above-mentioned receiving apparatus, the serial signal preferably includes the following signals:

(a) a plurality of first signals, each of which is the synchronizing signal, which are the same as each other, and which are apart from each other by a predetermined time interval; and (b) a plurality of second signals, each of which is the information signal, which are the same as each other, and which are apart from each other by the predetermined time interval.

The multiplying circuit generates a first multiplied signal by multiplying the synchronizing signal of the received signal by at least one delayed signal of the synchronizing signal based on the plurality of first signals, and generates a second multiplied signal by multiplying the information signal of the received signal by at least one delayed signal of the information signal based on the plurality of second signals. The detecting circuit detects the synchronizing signal based on the first multiplied signal, and detects the information signal from the second multiplied signal based on the detected synchronizing signal.

In the above-mentioned The receiving apparatus, the delaying circuit preferably comprises:

an A/D converter for converting the analog received signals into digital signals;

a digital memory for sequentially storing digital signals converted by the A/D converter;

a D/A converter for converting the digital signals stored in the digital memory into analog signals; and a timing generator for generating timing signals for controlling the A/D converter, the digital memory and the D/A converter to delay the analog received signals by the predetermined time interval and output delayed signals.

According to another aspect of the present invention, there is provided a communication system comprising:

a transmitting apparatus for transmitting a serial signal, which is a sequence of signals including at least one of a synchronizing signal and an information signal, and which includes a plurality of signals being the same as each other and being apart from each other by a predetermined time interval; and a receiving apparatus for receiving the serial signal transmitted by the transmitting apparatus through a transmission medium, and wherein the receiving apparatus comprises:

a receiving circuit for receiving the serial signal as a received signal;

a delaying circuit for generates a delayed signal by delaying the received signal received by the receiving circuit by the predetermined time interval;

a multiplying circuit for generating a multiplied signal by multiplying the received signal by the delayed signal; and a detecting circuit for detecting at least one of the synchronizing signal and the information signal, based on the multiplied signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 6 is a timing chart showing a problem operation which can be dissolved in a fourth preferred embodiment according to the present invention;

FIG. 8 is a timing chart showing an operation of the receiving apparatus shown in FIG. 7B;

FIG. 9 is a timing chart showing a problem operation which can be dissolved in a fifth preferred embodiment according to the present invention;

FIG. 11 is a timing chart showing an operation of the receiving apparatus shown in FIG. 10B;

FIG. 13 is a timing chart showing a problem operation which can be dissolved in a seventh preferred embodiment according to the present invention;

DETAILED DESCRIPTION OF THE PREFERRED EMBODIMENTS

Preferred embodiments according to the present invention will be described below with reference to the attached drawings.

First Preferred Embodiment

Figure 1A:
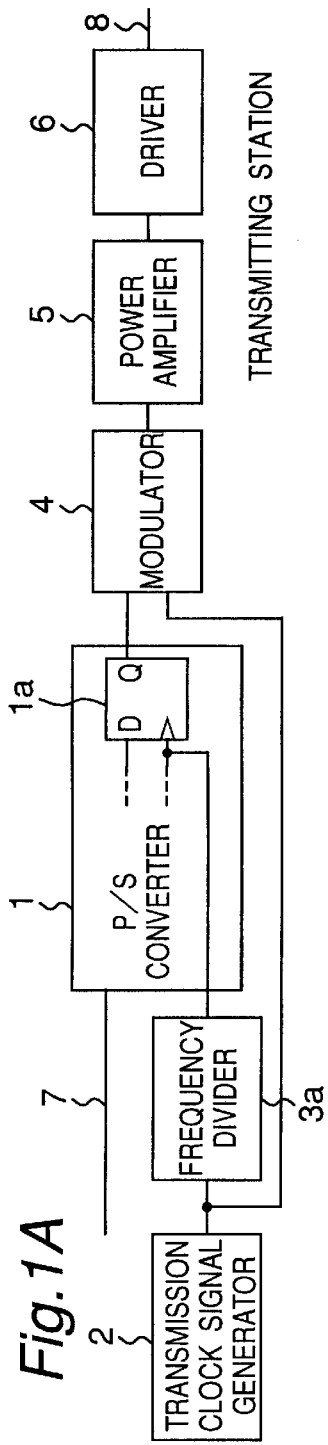
FIG. 1A is a block diagram showing a configuration of a transmitting apparatus for a transmitting station of a communication system of a first preferred embodiment according to the present invention.
Figure 1B:
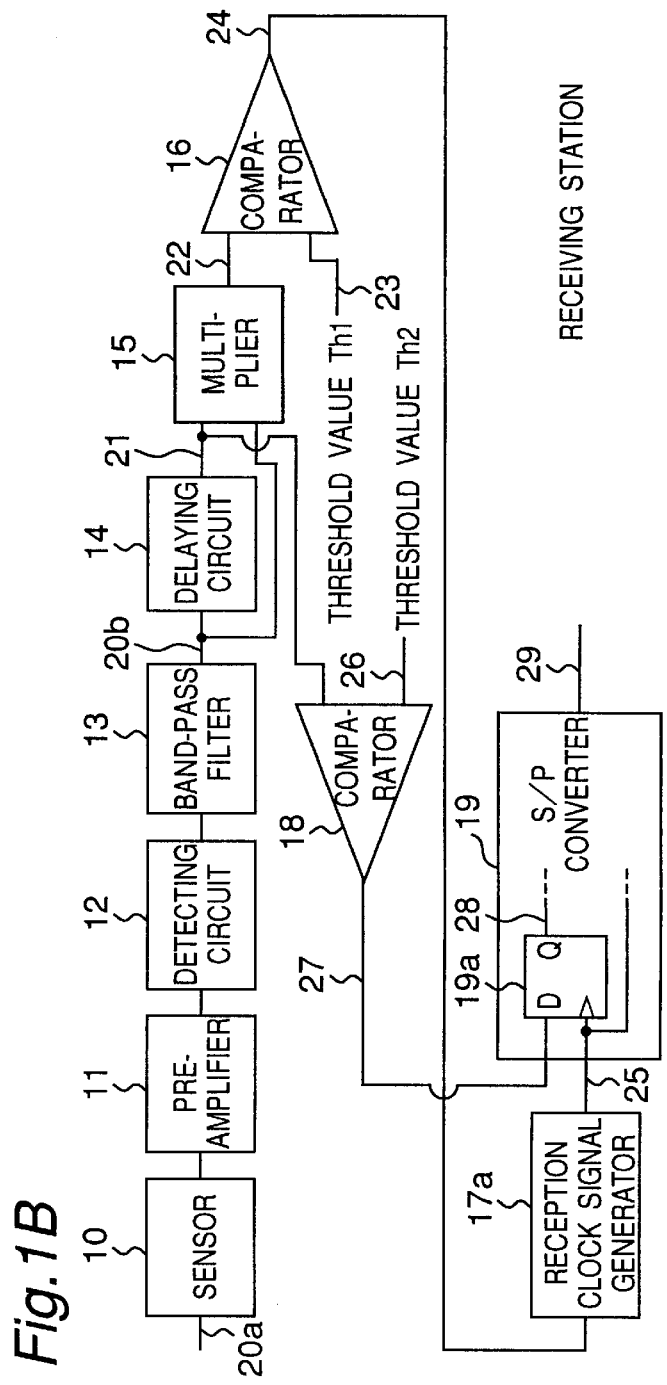
FIG. 1B is a block diagram showing a configuration of a receiving apparatus for a receiving station of the communication system of the first preferred embodiment according to the present invention.

A first preferred embodiment will be described hereinafter with reference to the attached drawings. FIG. 1A is a block diagram showing a configuration of a transmitting apparatus for a transmitting station of a communication system of a first preferred embodiment according to the present invention, and FIG. 1B is a block diagram showing a configuration of a receiving apparatus for a receiving station of the communication system of the first preferred embodiment.

Referring to FIG. 1A, the transmitting station of the present preferred embodiment comprises a parallel to serial converter (referred to as a P/S converter hereinafter) 1 including a delay type flip flop 1a, a transmission clock signal generator 2, a transmission clock signal frequency divider 3a, a modulator 4, a power amplifier 5, and a driver 6.

A transmission data 7 in a parallel form to be transmitted is first inputted to the P/S converter 1. The P/S converter 1 outputs a bit serial data from the delay type flip flop 1a of the last stage of the P/S converter 1, in synchronization with a signal (transmission clock signal), which is generated by the frequency divider 3a by frequency-dividing a signal generated by the clock signal generator 2. A carrier signal is then modulated according to the bit serial data by the modulator 4, and the modulated signal is amplified by the power amplifier 5 so as to convert the bit serial data into a transmitting signal suitable to a communication medium, and then, the transmitting signal is outputted via the driver 6 to the communication medium 8 such as a coaxial cable, a twist pair cable, an optical fiber cable or the like.

In the above process, the frequency divider 3a functions as a ½ frequency divider when transmitting a synchronizing bit. On the other hand, when transmitting an information bit, the frequency divider 3a outputs the clock signal from the transmission clock signal generator 2 as it is without dividing the signal from the transmission clock signal generator 2. Therefore, upon transmitting the synchronizing bit, the transmission clock signal generator 2 outputs the signal having a period which is twice the period of the normal transmission clock signal. Thus, while the P/S converter 1 converts the signal of one clock (in this case, of two bits), the time of two bits elapses in the modulator 4, resulting in that two successive bits of the synchronizing bit are outputted. In other words, the present transmitting station certainly transmits two synchronizing bits, and transmits an information bit of data to be transmitted bit by bit.

Referring to FIG. 1B, the receiving station of the preferred embodiment comprises a sensor 10, a preamplifier 11, a detecting circuit 12, a band-pass filter 13, a delaying circuit 14, a multiplier 15, a comparator 16, a reception clock signal generator 17a, a comparator 18, and a serial to parallel converter (referred to as an S/P converter hereinafter) 19 including a delay type flip flop 19a.

A signal 20a received via the communication medium is first converted to an electric signal by the sensor 10, then the electric signal is amplified by the preamplifier 11, is detected by the detecting circuit 12, and is passed through the band-pass filter 13 so as to demodulate the received electric signal into a received signal 20b. The received signal 20b is then inputted to the delaying circuit 14 and the multiplier 15.

The received signal 20b inputted to the delaying circuit 14 is delayed by the delaying circuit 14 by a time interval of one bit, and then is outputted as a delayed signal 21. The delayed signal 21 is then inputted to the multiplier 15 and the comparator 18.

As a result, the delayed signal 21, which is the received signal 20b delayed by the time interval of one bit, as well as the received signal 20b without being delayed are inputted to multiplier 15. The multiplier 15 then outputs a multiplied signal 22 having a value of a product obtained by multiplication of the delayed signal 21 by the received signal 20b. The multiplied signal 22 is then inputted to the comparator 16.

The comparator 16 for detecting the synchronizing signal detects or judges whether or not the multiplied signal 22 exceeds a predetermined threshold value Th1, which is an amplitude vale of a signal 23. If the multiplied signal 22 is larger than the threshold value Th1, the comparator 16 generates and outputs a signal 24 having a predetermined value to the reception clock signal generator 17a. On the other hand, if the multiplied signal 22 is not larger than the threshold value Th1, the comparator 16 generates and outputs the signal 24 having a value of zero to the reception clock signal generator 17a.

The reception clock signal generator 17a operates so that a leading edge of the signal 24 is judged as detection of the synchronizing signal, namely, the synchronizing signal is detected at a leading edge of the signal 24. The reception clock signal generator 17a generates a reception clock signal 25, which rises every one-bit time interval from a timing point when the total time of the time interval of two bits of the synchronizing signal plus a predetermined delay time has been elapsed from a timing point when the reception clock signal generator 17a detects the synchronizing signal. Then the reception clock signal 25 is inputted to the S/P converter 19.

On the other hand, the delayed signal 21 outputted from the delaying circuit 14 is also inputted to the comparator 18. Then, the comparator 18 for detecting the information signal detects or judges whether or not the delayed signal 21 exceeds a predetermined threshold value Th2, which is an amplitude vale of a signal 26. If the delayed signal 21 is larger than the threshold value Th2, the comparator 18 generates and outputs a signal 27 having a predetermined value to the S/P converter 19. On the other hand, if the delayed signal 21 is not larger than the threshold value Th2, the comparator 18 generates and outputs the signal 27 having a value of zero to the S/P converter 19.

The S/P converter 19 outputs the inputted signal 27 as an output signal 28 from the delay type flip flop 19a of the first stage thereof, in synchronization with the reception clock signal 25 outputted from the reception clock signal generator 17a, and then, converts the output signal 28 into a parallel signal and outputs the same parallel signal. Thus, a received data 29 in a parallel form can be obtained as an output signal from the whole of the S/P converter 19.

Figure 2:
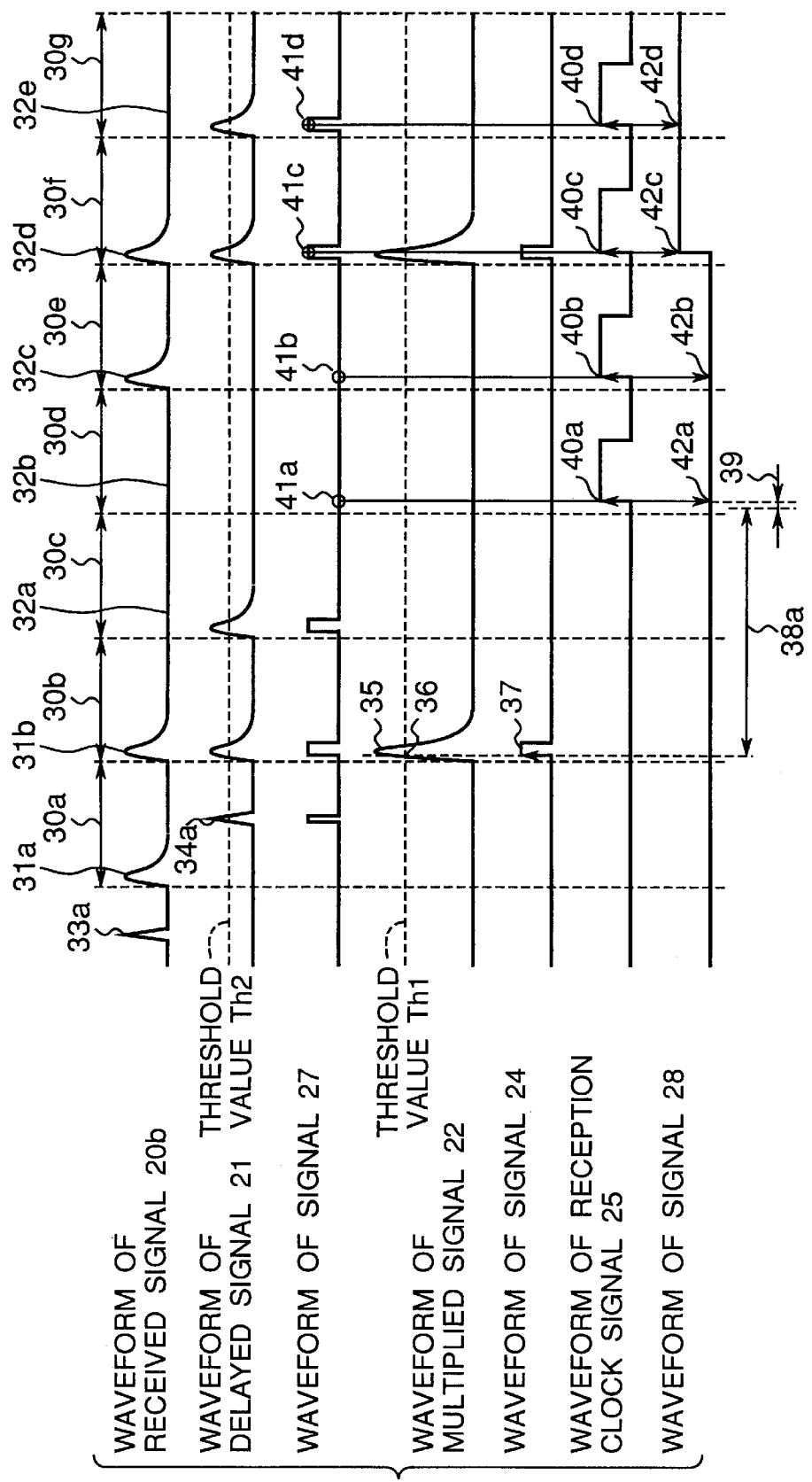
FIG. 2 is a timing chart showing an operation of the receiving apparatus shown in FIG. 1B.

Next, a relationship among the signals within the receiving apparatus will be described. FIG. 2 is a timing chart showing an operation of the receiving apparatus shown in FIG. 1B, and shows the relationship among the received signal 20b, delayed signal 21, multiplied signal 22 and so on. Each of time intervals 30a, 30b, 30c, 30d, 30e, 30f, and 30g shown in FIG. 2 represents a time interval of one bit.

In the waveform of the received signal 20b which is the output signal from the band-pass filter 13, each of signals 31a and 31b is a synchronizing signal which is a signal of the synchronizing bit, and each of signals 32a, 32b, 33c, 32d, and 32e is an information signal which a bit signal of information data. This waveform shows an example in which the signal of the synchronizing bits include "1" of two bits, and the bit signals of the information data include "0", "0","1","1", and "0", respectively, in an order from the signal 32a to the signal 32e.

In the above example, if the bit data is "1", there is a rising signal only in a certain early portion of one-bit time interval as shown in the signals 31a, 31b, 32c and 32d. On the other hand, if the bit data is "0", there is no rising signal as shown in signals 32a, 32b and 32e. The present invention is not limited to this example, and there should be at least a binary differentiation between "1" and "0" in these signals.

The signal 33a is a noise signal, which also appears as a signal 34a in a waveform of the delayed signal 21. It should be noted here that each of these noise signals 33a and 34a has a peak value similar to those of the signals 31a and 31b of the synchronizing bits as well as those of the signals 32c and 32d of the bit data "1".

The delayed signal 21 outputted from the delaying circuit 14 has the same waveform as that of the received signal 20b, except for that the waveform of the received signal 20b is translated rightward by the amount of one-bit time interval, where the time advances rightward. The signal 27 is an output signal from the comparator 18, when the delayed signal 21 and the signal having the threshold value Th2, which is the amplitude value of the signal 26, are inputted to the comparator 18.

The noise signal 33a included in the received signal 20b exists ahead of the signal 31a of the synchronizing bit. However, in the multiplied signal 22 between the received signal 20b and the delayed signal 21, which is the output signal from the multiplier 15, an effect of the noise signal is eliminated by the multiplication. Then a signal 35 is generated for the time interval 30b based on synchronization detection. Thus, the output signal 24 from the comparator 16 generates a signal 37, as a synchronization detection signal, when the signal 35 exceeds the threshold value Th1, which is the amplitude value of the signal 23.

Further, the reception clock signal generator 17a generates the reception clock signal 25 upon reception of the synchronization detection signal 37. In other words, the reception clock signal generator 17a generates the reception clock signal 25, which rises every one-bit time interval, from a timing point after being delayed by a predetermined constant delay time 39 for certainly acquisition of received data from another timing point of a leading edge of the synchronizing detection signal 37 in the signal 24 plus two-bit time interval 38a which is the time interval of the two synchronizing bits.

At each of timing points 40a, 40b, 40c and 40d of the reception clock signal 25, data of the signal 27 is sampled at respective timing points 41a, 41b, 41c and 41d, and then is decoded. Decoded data obtained at timing points 42a, 42b, 42c and 42d represent values "0", "0", "1" and "1" respectively, and these data are identical with data of the received signal 20b "0", "0", "1" and "1" included in signals 32a, 32b, 32c and 32d respectively, and this shows a success in the decoding operation.

According to the present preferred embodiment, the receiving apparatus generates the multiplied signal by multiplying the received signal by the delayed signal, which is the received signal delayed by two synchronization time interval, and the information signal is decoded based on the synchronizing signal which is detected based on the multiplied signal. Therefore, the synchronizing signal can be detected correctly even if the noise signal (pulse) exists before the synchronizing signal. Further, there is no significant decrease in transmission speed since the transmission can be made in a minimum necessary pulse width of either a unit of the synchronizing signal of two bits or a unit of the information signal of one bit.

Second Preferred Embodiment

Figure 3A:
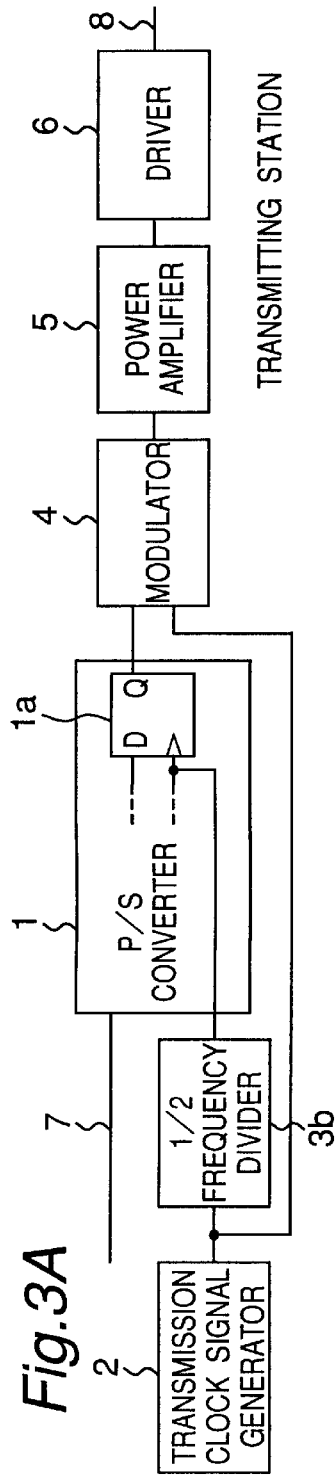
FIG. 3A is a block diagram showing a configuration of a transmitting apparatus for a transmitting station of a communication system of a second preferred embodiment according to the present invention.
Figure 3B:
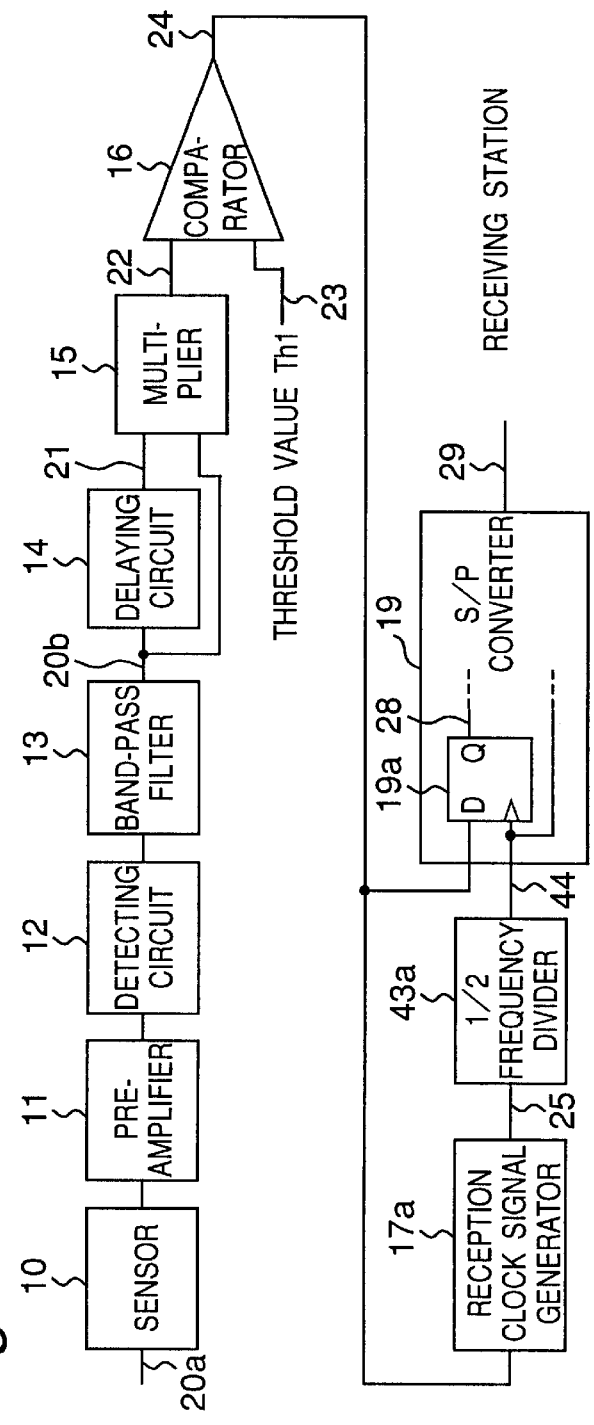
FIG. 3B is a block diagram showing a configuration of a receiving apparatus for a receiving station of the communication system of the second preferred embodiment according to the present invention.

Another preferred embodiment will now be described with reference to the accompanying drawings. FIG. 3A is a block diagram showing a configuration of a transmitting apparatus for a transmitting station of a communication system of a second preferred embodiment according to the present invention, and FIG. 3B is a block diagram showing a configuration of a receiving apparatus for a receiving station of the communication system of the second preferred embodiment.

The transmitting apparatus for the transmitting station of the present preferred embodiment differs from that of the first preferred embodiment in that a frequency divider 3b functions as a ½ frequency divider for both cases of the synchronizing bit and the information bit. In the other words, the transmitting station of the present preferred embodiment certainly transmits two bits of the synchronizing bit, and transmits two bits of the same data for each information bit.

On the other hand, the receiving apparatus for the receiving station of the present preferred embodiment differs from that of the first preferred embodiment in the followings:

(1) serial data input terminal of the S/P converter 19 is electrically connected to the output terminal for the output signal 24 from the comparator 16 which detects the synchronizing signal and the information signal;

(2) the output signal 25 from the reception clock signal generator 17a is inputted to the clock input terminal of the S/P converter 19 via a ½ frequency divider 43a; and (3) the comparator 18 used in the first preferred embodiment is eliminated. In other words, the signal 24, which is used for synchronization detection in the first preferred embodiment, is used as the serial data input signal to the S/P converter 19.

Further, the signal 25 outputted from the reception clock signal generator 17a is inputted to the ½ frequency divider 43a, which then outputs a signal 44, which rises every two-bit time interval, from a timing point after the two-bit time interval plus a predetermined constant delay time from the timing point of synchronization detection.

Figure 4:
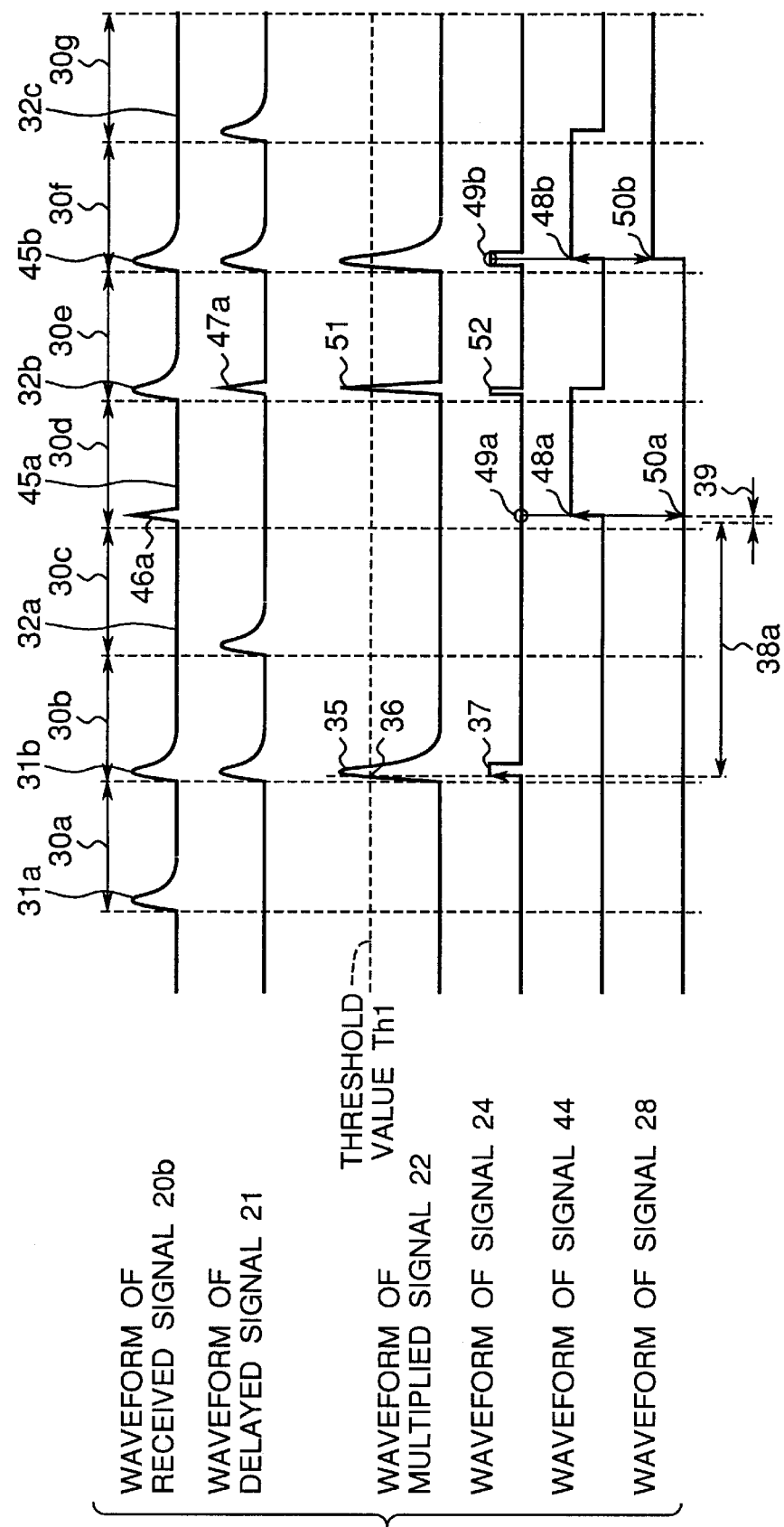
FIG. 4 is a timing chart showing an operation of the receiving apparatus shown in FIG. 3B.

Next, a relationship among the signals within the receiving apparatus will be described. FIG. 4 is a timing chart showing an operation of the receiving apparatus shown in FIG. 3B, and shows a relationship among the received signal 20b, delayed signal 21, multiplied signal 22 and so on. Each of the time intervals 30a, 30b, 30c, 30d, 30e, 30f, and 30g shown in the timing chart of FIG. 4 represents the time interval for one bit.

Referring now to a waveform of the received signal 20b, each of signals 31a and 31b is a signal of the synchronizing bit, and each of signals 32a, 45a, 32b, 45b, and 32c is a bit signal of information data. A pair of signals 32a and 45a and a pair of signals 32b and 45b are each signals containing two successive bits of the same data. This is to match the transmission pattern from the transmitting station in which two successive bits of the synchronizing bit are transmitted followed by the information bits transmitted in the same pattern, i.e. two successive bits of the same data for each information bit. This waveform shows an example in which two bits of "1" are included as the synchronizing signals in the signals 31a and 31b, and information data bit signals "0", "0", "1", and "1" are included in the signals 32a to 45b, respectively. In this case, the data bits to be transmitted from the transmitting station to the receiving station are "0" and "1". Namely, the same information signals of two bits, which the transmitting station wishes to transmit to the receiving station, are transmitted by the transmitting station.

A signal 46a is a noise signal, which also appears as a signal 47a in a waveform of the delayed signal 21. It should be noted here that each of these noise signals 46a and 47a has a peak value similar to that of the signals 31a and 31b of the synchronizing bits as well as that of the signals 32b and 45b of the bit data "1". Further, the noise signal 46a is superimposed on the signal 45a for a time interval 30a of FIG. 4.

The delayed signal 21 outputted from the delaying circuit 14 has the same waveform as that of the received signal 20b, except for that the waveform of the received signal 20b is translated rightward by the amount of one-bit time interval, where the time advances rightward. Referring to the multiplied signal 22 which is the product signal between the received signal 20b and the delayed signal 21, there is generated a signal 35 having a value, which is larger than the threshold value Th1 which is the amplitude value of the signal 23, at a timing point 36 of the time interval 30b. Then in response to generation of the signal 35, the signal 37 is generated in the signal 24, which then becomes a synchronizing detection signal.

The reception clock signal generator 17a generates the signal 25, which is inputted to the ½ frequency divider 43a. The ½ frequency divider 43a halves the frequency of the inputted signal 25, so that the output signal 44 from the ½ frequency divider 43a rises every two-bit time interval from a time point after the time interval of two bits plus a predetermined constant delay time from the timing point of synchronizing detection. Therefore, the signal 44 rises at the timing points 48a and 48b, respectively.

At each of the timing points 48a and 48b in the signal 44, data of the signal 24 is sampled at respective timing points 49a and 49b, and then is decoded. The data decoded at respective timing points becomes "0" and "1" in an order of the timing points 50a and 50b of the signal 44, and these data are equal to the transmitted original data bit sequence "0" and "1".

It should be noted here that multiplication of the noise signal 47a by the signal 32b generates a signal 51 in the multiplied signal 22, and this leads to generation of a signal 52 in the signal 24. However, because the timing point when the signal 52 is generated is not leading edges 48a and 48b of the signal 44, data sampling is not performed, and therefore, decoding can be carried out correctly even with the presence of the noise signal 46a.

In the above description of the second preferred embodiment, the same synchronization detection method as used in the first preferred embodiment is used, however, the present invention is not limited to this. Any other synchronization detecting method maybe used, as long as the transmitting station transmits two identical bits for every data bit whereas the receiving station multiplies at the multiplier the received signal and the delayed signal, i.e. the received signal delayed by one-bit time interval, so that the value of the product signal is sampled every two-bit time interval and is decoded.

According to the present preferred embodiment, the received transmission signal is delayed by an amount of time interval equal to the time interval between two information signals to generate the delayed signal. This delayed signal is multiplied by the received signal to generate a multiplied signal. Then the information signal is decoded based on the multiplied signal. Therefore, in addition to the advantages achieved by the first preferred embodiment, the information signals can be decoded correctly even if the noise signal (pulse) exists between the data.

Third Preferred Embodiment

Each of the delaying circuits used in the first and second preferred embodiments can be realized by using a delay line for example, if one-bit time interval is relatively short. However, difficulties will arise if one-bit time interval is relatively long, and therefore, this case is excogitative. Thus, according to the present preferred embodiment, arrangement is made so that the delayed signal can be generated even if one-bit time interval is relatively long. This can be possible as follows. An input signal is converted into digital data by an A/D converter, and the digital data is successively stored in a digital memory, from which digital data stored one-bit time interval before is successively taken out for re-conversion by a D/A converter to the analog data. Through the above processing, an analog signal delayed by one-bit time interval can be generated.

Figure 5:
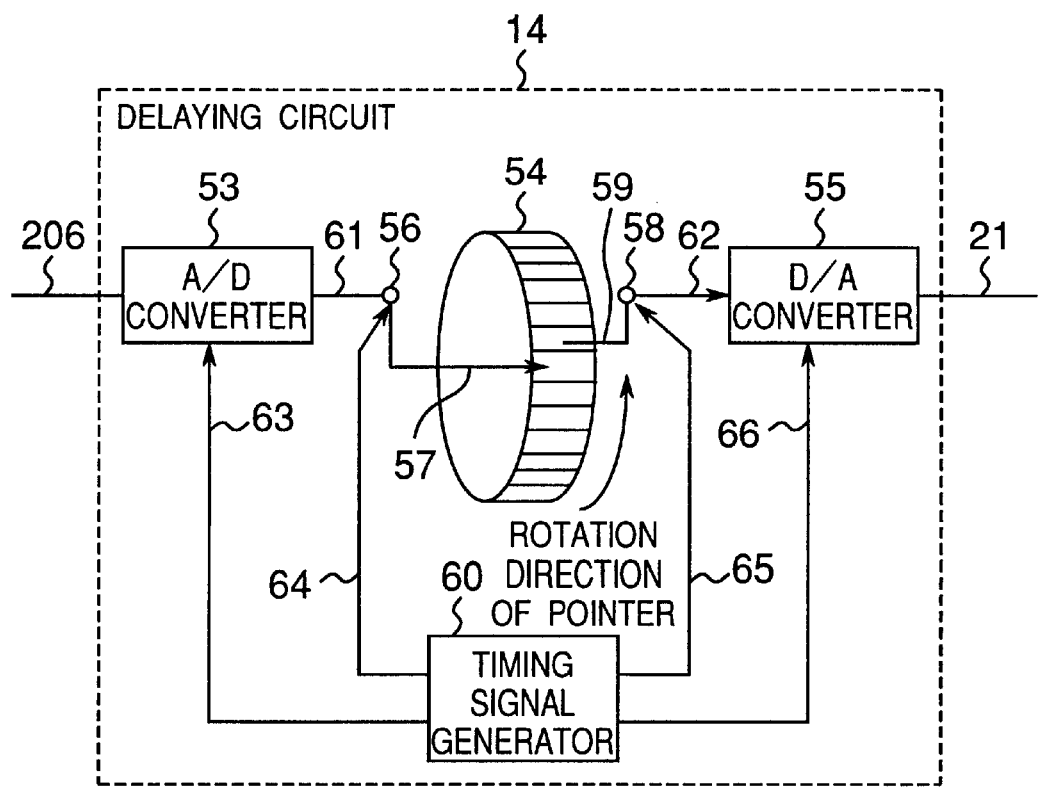
FIG. 5 is a block diagram showing a delaying circuit 14 shown in FIG. 3B

Description will now be made for such a delaying circuit as above capable of performing even if one-bit time interval is relatively long. FIG. 5 is a block diagram showing a configuration of the delaying circuit 14 shown in FIG. 3B. A component indicated by a numeral reference 14 corresponds to the delaying circuit 14 of the first and second preferred embodiments. Further, an input signal 20b and an output signal 21 correspond to the received signal 20b and the delayed signal 21, respectively, as shown in FIGS. 1 and 3.

This delay circuit 14 is provided with the following components:

(a) an A/D converter 53;
(b) a ring-type digital memory 54;
(c) a D/A converter 55;
(d) a switch 56 for selecting an address of the ring-type digital memory 54 for storage of a digital signal 61 resulted from A/D conversion;
(e) a storing address pointer 57 for indicating the storing or writing address;
(f) a switch 58 for selecting an address for reading the digital signal 61 for D/A conversion;
(g) a pointer 59 for indicating the reading address; and
(h) a timing signal generator 60.

The timing signal generator 60 generates the following timing signals:

(a) a timing signal 63 for indicating a timing of the A/D conversion for the A/D converter 53;
(b) a timing signal 64 for indicating a switching timing for the storing address switch 56;
(c) a timing signal 65 for indicating a switching timing for the reading address switch 58; and
(d) a timing signal 66 for indicating a timing of the D/A conversion for the D/A converter 55.

The timing signals 64 and 65 are generated so that a switching cycle T of the switches 56 and 58 becomes a value T (T is one-bit time interval/N), where N is the number of samples within one-bit time interval. The signal 61 is stored at the address indicated by the address pointer 55 upon generating the timing signal 64. After the signal 61 is stored at an address i, the storing address pointer 57 indicates the next address i +1, and then indicates an address 1 after the address N. Thus, the sampled signal 61 is stored successively in a rotation manner in an order of 1, 2, . . . , N, 1, 2, . . .

On the other hand, in a manner similar to that of the storing address pointer 57, the reading address pointer 59 indicates the next address i+1 after reading the signal from the address i, and then, indicates the address 1 after indicating the address N. Actually, however, the reading address pointer 59 indicates the address that was indicated by the storing address pointer 57 N times before. Namely, in this case, since data signals are stored at the circulated or cyclic addresses, and therefore, the reading address pointer 59 indicates the address immediately after one address from the address as indicated by the storing address pointer 57. Upon generating the timing signal 65, the signal 62 stored at the address indicated by the reading address pointer 59 is read out. The read out data is the data stored one-bit time interval before, and then, there is generated a delayed signal delayed by one-bit time interval.

The ring-type memory 54 must have a memory capacity that is equal to or larger than 10 words in consideration to the width of digital bits of the A/D converter 53 and the D/A converter 55, taking also into account that data sampling, storage and reading operations are made at least 10 times for one-bit time interval. The memory capacity of the ring-type memory 54 must be not smaller than 100 words for the first and second preferred embodiments, in which demodulation is performed on the signal which includes the modulation signal only in a certain early period of one-bit time interval. This is because the modulated signal in this particular portion of one-bit time interval is sampled at least 10 times for data storage and reading operations, for example, in order to sample the data signals for one-bit time interval.

It should be noted here that the time required for conversion by the A/D converter 53 and storage to the digital memory 54, as well as the time required for conversion by the D/A converter 55 and reading from the digital memory 54 must be shorter than a time interval given by a division of one-bit time interval by the number of samples.

The delaying circuit 14 of the present preferred embodiment is provided with the A/D converter 53, the digital memory 54 for sequential storage of the digital signals converted by the A/D converter 53, the D/A converter 55 for converting the digital signals stored in the digital memory 54, and the timing signal generator 60 for generating timing signals for controlling the A/D converter 53, the switches 56 and 58, the D/A converter 55 to delay the digital signal stored in the digital memory 54 by a predetermined time interval and outputs the same. With the above arrangement, it becomes possible to store the signal sequentially from the A/D converter 53 into the digital memory 54, as well as taking or reading out the signal sequentially from the digital memory 54, then this makes possible to generate the delayed signal even if one-bit time interval is relatively long.

Fourth Preferred Embodiment

Even with the arrangement described in the first preferred embodiment, a specific pattern of inclusion of a noise signal may cause the receiving apparatus to fail in correct synchronization detection. Description will be made now for a method capable of performing the synchronization detection correctly even in such a pattern of inclusion of a noise signal.

Before describing the above method, it should be worthwhile to see a timing chart of FIG. 6, which is a timing chart showing a problem operation which can be dissolved in a fourth preferred embodiment according to the present invention, and which shows a case where correct synchronization detection cannot be made by the method according to the first preferred embodiment.

Signals shown in the FIG. 6 are essentially the same as those in FIG. 2 used in the description of the first preferred embodiment, except that a noise signal 33b is further included or applied in addition to the noise signal 33a. It is noted the noise signal 33a and the noise signal 33b are apart from each other by exactly one-bit time interval. Otherwise, the two signals are the same as each other in the waveforms and all the aspects other than this generation timing.

The noise signal 33b is included exactly one-bit time interval after the noise signal 33a. This causes generation of a signal 67 in the multiplied signal 22 of FIG. 6, which in turn causes generation of a signal 68 in the signal 24. This signal 68 rises prior to the genuine synchronization detection signal 37, and this causes an error in the synchronization detection, because the rise or leading edge of the signal 68 is misinterpreted as the synchronization detection.

As a result, decoding is performed at each of the leading edges 69a, 69b, ..., 69e of the signal 25, after sampling data in the signal 27 at each of the timing points 70a, 70b, ..., 70e. The resulting decoded bit data is "0" for all of the respective timing points 71a, 71b, ..., 71e, being different from the original information in the received data "0", "0", "1", and "1".

Figure 7A:
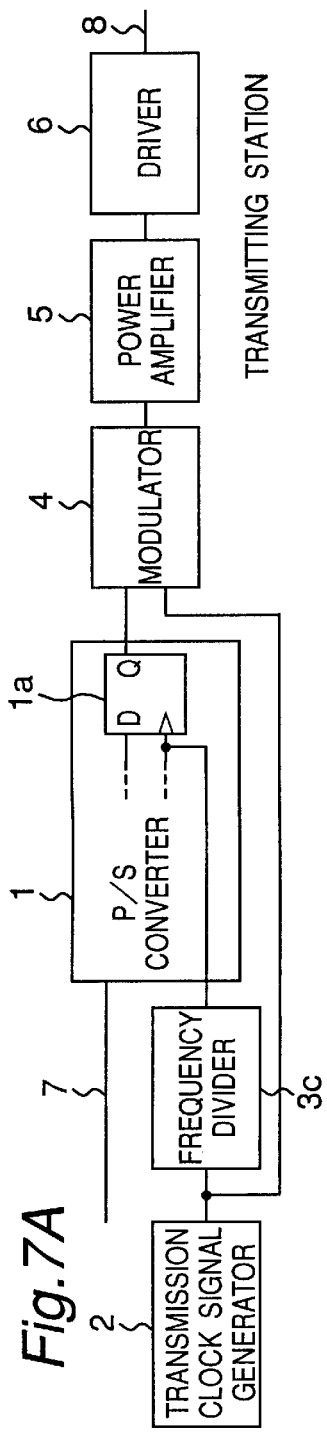
FIG. 7A is a block diagram showing a configuration of a transmitting apparatus for a transmitting station of a communication system of the fourth preferred embodiment according to the present invention.
Figure 7B:
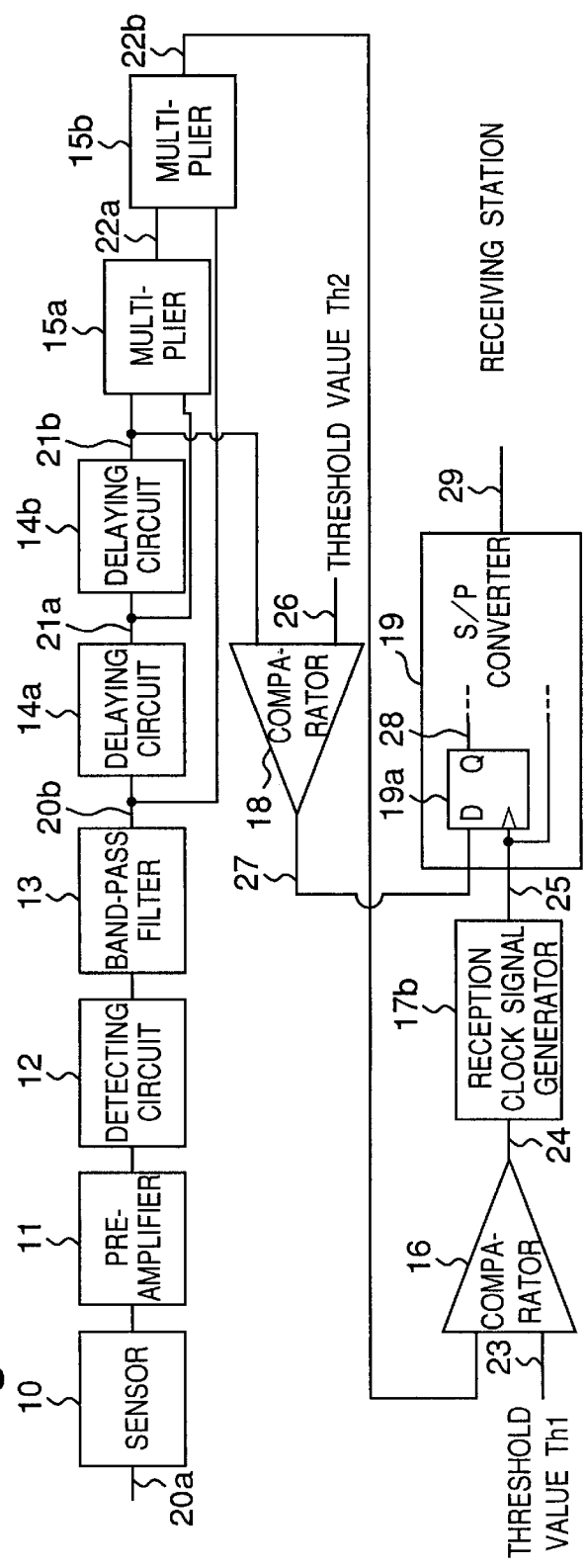
FIG. 7B is a block diagram showing a configuration of a receiving apparatus for a receiving station of the communication system of the fourth preferred embodiment according to the present invention.

FIG. 7A is a block diagram showing a configuration of a transmitting apparatus for a transmitting station of a communication system of the fourth preferred embodiment according to the present invention, and FIG. 7B is a block diagram showing a configuration of a receiving apparatus for a receiving station of the communication system of the fourth preferred embodiment.

The transmitting apparatus for the transmitting station differs from that of the first preferred embodiment in that a frequency divider 3c functions as a ⅓ frequency divider upon transmitting the synchronizing bit. When transmitting the information bit, however, the clock signal from the transmission clock signal generator 2 is outputted as it is, or without dividing the frequency of the transmission clock signal, and this operation is the same as that of the first preferred embodiment. In other words, the transmitting apparatus for the transmitting station certainly outputs three synchronizing bits, and then transmit bit by bit the information data to be transmitted.

On the other hand, the receiving apparatus for the receiving station differs from that of the first preferred embodiment in the following three differences.

The first difference is that two delaying circuits 14a and 14b and two multipliers 15a and 15b are provided. A signal 21a, which is a delayed signal as delayed by one-bit time interval by passing the signal 20a through one delaying circuit 14a, and a signal 21b, which is a delayed signal as delayed by one-bit time interval by passing the signal 20b through the two delaying circuit 14a and 14b, are multiplied by the multiplier 15a to generate a product or multiplied signal 22a. The multiplied signal 22a and the received signal 20b without passing through any delaying circuit are multiplied by the multiplier 15b to generate a triplex product or multiplied signal 22b, which is then inputted to the comparator 16 for detecting the synchronizing signal. On the other hand, in the first preferred embodiment, the delayed signal obtained by passing the received signal 20a through the one delaying circuit 14 is multiplied by the received signal 20a, which is not passed through any delaying circuit, and the product or multiplied signal is inputted to the comparator 16.

The second difference is that the delayed signal 21b, which is passed through the two delaying circuits 14a and 14b is inputted to the comparator 18 for detecting the information signal. On the other hand, in the first preferred embodiment, the signal which is passed through delaying circuit 14 of one stage is inputted to the comparator 18.

The third difference is that in the reception clock signal generator 17b, the time from the synchronization detection to the first rise or leading edge of the reception clock signal is set to a time interval for three synchronizing bits plus a predetermined constant delay time. On the other hand, in the first preferred embodiment, this time is set to a time interval of two synchronizing bits plus a predetermined constant delay time. It is to be noted in the present preferred embodiment that in a manner similar to that of the first preferred embodiment, the reception clock signal generator 17b generates the reception clock signal which rises every one-bit time interval from the first rise or leading edge of the reception clock.

Next, a relationship among the signals within the receiving apparatus will be described. FIG. 8 is a timing chart showing an operation of the receiving apparatus shown in FIG. 7B, and shows a relationship among the received signal 20b, delayed signals 21a, 21b, multiplied signal 22b and so on. Each of time intervals 30a to 30i shown in the timing chart of FIG. 8 represents a time interval of one bit.

Referring now to a waveform of the received signal 20b, signals 31a, 31b and 31c are synchronizing bit signals, respectively, and signals 32a to 32f are bit signals of information data, respectively. This waveform shows an example in which three bits of "1" are included as the synchronizing signals, and information data, "0", "0", "0", "1", "1" and "1" are included respectively in an order of the signals 32a to 32f.

Further, signals 33a and 33b are noise signals respectively, which appear also as signals 34a and 34b in a waveform of the delayed signal 21a, and appear as signals 72a and 72b in a waveform of the delayed signal 21b. It should be noted here that each of these noise signals 33a and 33b has a peak value similar to that of the synchronizing bit waveform and data "1" waveform. In a manner similar to that of the timing chart shown in FIG. 6, the noise signals 33a and 33b are apart from each other by a time interval of one bit.

The delayed signal 21a outputted from the delaying circuit 14a has the same waveform as that of the received signal 20b, except for that the received signal is translated rightward by the amount of one-bit time interval, where the time advances rightward. Further, the delayed signal 21b obtained by passing the delayed signal 21a through the delaying circuit 14b has the same waveform as that of the delayed signal 21a, except for that the delayed signal 21a is translated rightward by the amount of one-bit time interval, namely, that the received signal 20b is translated rightward by two-bit time interval.

Referring to the multiplied signal 22b which is the triplex product signal of the received signal 20b, the delayed signal 21a and the delayed signal 21b, the signal 73 having a value exceeding the threshold value Th1 at a timing point 74 is generated, and then, in accordance to generation of this signal 73, a signal 75 is generated in the signal 24, which becomes a synchronization detection signal.

Upon reception of the synchronization detection signal 75, the reception clock signal generator 17b generates the reception clock signal 25, which rises every one-bit time interval from a timing point, a predetermined constant delay time 39 for certainly acquisition of the received data after another timing point, which is three-bit time interval 38b after from a leading edge of the signal 75 in the signal 24. As a result, the signal 25 has a waveform with a rise or leading edge at each of the timing points 76a, 76b, 76c and 76d.

At each of the timing points 76a, 76b, 76c, 76d of the signal 25, data of the signal 27 is sampled at respective timing points 77a, 77b, 77c, and 77d, and then the sampled data is decoded. The data decoded at timing points 78a, 78b, 78c, and 78d give values "0", "0", "0" and "1" respectively, and these data are identical with a series of received data bits "0", "0", "0", and "1".

In the above-mentioned receiving apparatus according to the present preferred embodiment, the transmitted signal with three bits of synchronizing signals are received by the reception circuit. The received signal is delayed by the amount of time interval between two synchronizing signals to generate the first delayed signal, and then, the first delayed signal is further delayed by an additional amount of the time interval between the two synchronizing signals to generate the second delayed signal. The first delayed signal, the second delayed signal and the received signal are multiplied to generate the multiplied signal. The synchronizing signal is detected based on this multiplied signal, and decoding is performed on the basis of the detected synchronizing signal. With the above arrangement, it becomes possible to correctly detect the synchronizing signal even if the noise signal (pulse) exists before the synchronizing signal and if another noise signal exists at a time interval equal to the time interval between the two synchronizing signals. Further, there is no significant decrease in transmission speed since the transmission can be made in a minimum necessary pulse width comprising three bits of the synchronizing signals followed by transmitting the information signal bit by bit.

According to the present preferred embodiment, the transmitting apparatus for the transmitting station transmits three bits of the synchronizing bit. On the other hand, the receiving apparatus for the receiving station performs synchronization detection based on the triplex product signal of the received signal, the delayed signal with one-bit time interval delay and the delayed signal with two-bit time interval delay. The present invention is not limited to this, for example, the transmitting apparatus for the transmitting station may transmit n bits of synchronizing bits (n is an integer, and n>4). In such a case, the receiving apparatus for the receiving station should generate a series of delayed signals with successively increasing delays, starting from one-bit time interval delay to (n−1)-bit time delay, with an increment of one-bit time interval. The receiving apparatus for receiving station multiplies all of these delayed signals and the received signal to generate an n-plex product signal, and then, the synchronization detection is performed based on this n-plex product signal.

In this case, correct synchronization detection is possible even if three or more noise signals having a time difference of one-bit time interval from each other is superimposed on the neighborhood of the synchronizing bit, and the peak value of the noise signals have a level similar to that of the synchronizing signal, as long as the number of noise signals is not greater than (n−1).

Fifth Preferred Embodiment

Even with the configuration described in the second preferred embodiment, a specific pattern of noise inclusion may cause the receiving apparatus to fail in correct decoding. Description will be made now for a method capable of performing a correct decoding even in such a pattern of noise inclusion.

Before describing the above method, it should be worthwhile to see a timing chart of FIG. 9, which is a timing chart showing a problem operation which can be dissolved in a fifth preferred embodiment according to the present invention, and which shows a case where correct decoding cannot be made by the method according to the second preferred embodiment. Signals shown in the FIG. 9 are essentially the same as those in FIG. 4 used in the description of the second preferred embodiment, except that a noise signal 46b is further included in addition to the noise signal 46a. It should be noted that the noise signal 46a and the noise signal 46b are apart from each other exactly by one-bit time interval, and the waveforms or the like shown in FIG. 9 are the same as those shown in FIG. 4 except for this generation timing.

The noise signal 46b is superimposed exactly one-bit time interval before the noise signal 46a. This causes generation of a signal 79 in the multiplied signal 22 as shown in FIG. 9, which in turn causes generation of a signal 80 in the signal 24. As a result, if data of the signal 24 at each of the timing points 49a and 49b is sampled and decoded at each of the leading edges 48a and 48b of the signal 44, the decoded data at each of the timing points 50a and 50b becomes "1" and "1", respectively, being different from the original true received data "0" and "1".

Figure 10A:
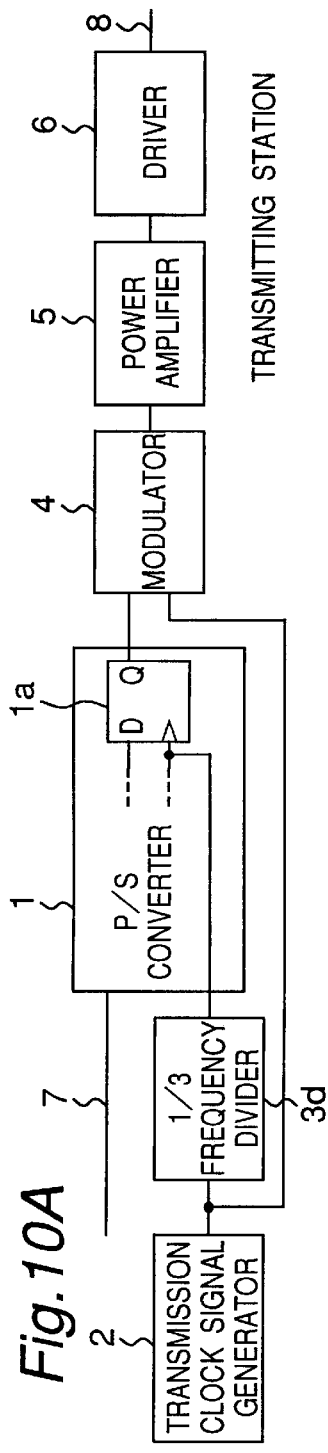
FIG. 10A is a block diagram showing a configuration of a transmitting apparatus for a transmitting station of a communication system of the fifth preferred embodiment according to the present invention.
Figure 10B:
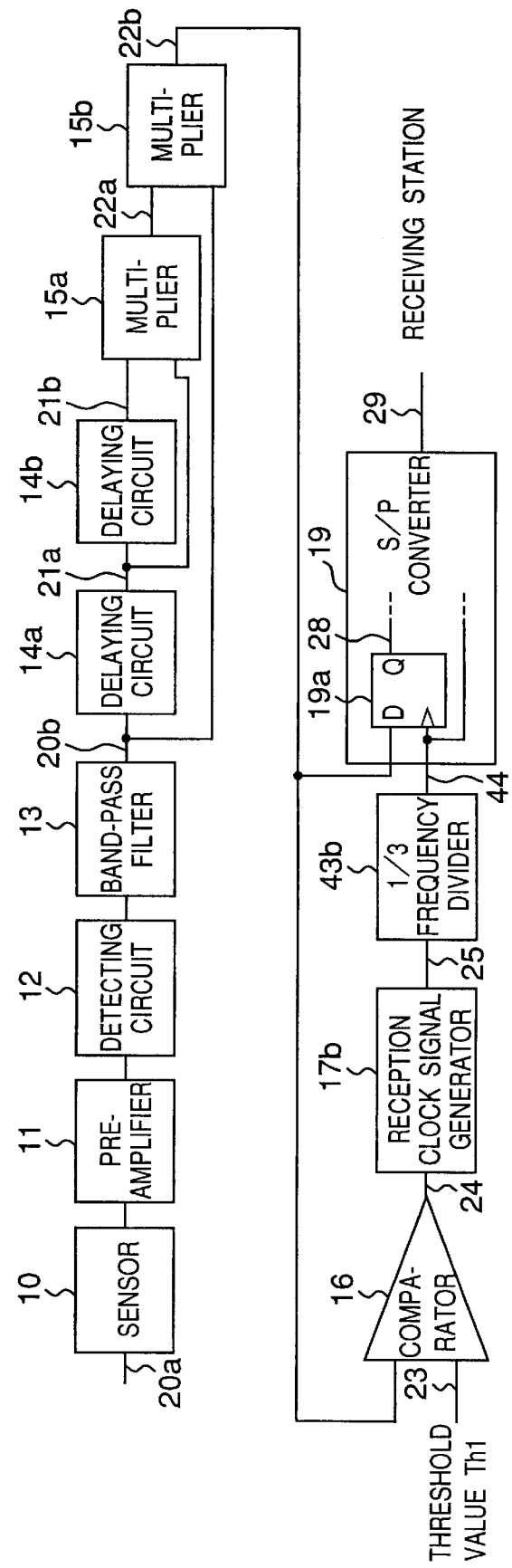
FIG. 10B is a block diagram showing a configuration of a receiving apparatus for a receiving station of the communication system of the fifth preferred embodiment according to the present invention.

FIG. 10A is a block diagram showing a configuration of a transmitting apparatus for a transmitting station of a communication system of the fifth preferred embodiment according to the present invention, and FIG. 10B is a block diagram showing a configuration of a receiving apparatus for a receiving station of the communication system of the fifth preferred embodiment.

The transmitting apparatus for the transmitting station differs from that of the second preferred embodiment in that a frequency divider 3d functions as a ⅓ frequency divider. On the other hand, in the second preferred embodiment, the frequency divider 3b functions as a ½ frequency divider. In other words, the transmitting apparatus for the transmitting station of the present preferred embodiment certainly transmits three synchronizing bits, and then transmits three bits of the same data for each information bit. On the other hand, in the second preferred embodiment, the two synchronizing bits are transmitted, followed by two bits of the same data for each information bit.

The receiving apparatus for the receiving station differs from that of the second preferred embodiment in the following three aspects.

The first difference is that two delaying circuits 14a and 14b and two multipliers 15a and 15b are provided. The signal 21a passes through only one delaying circuit 14a, which is a delayed signal 21a with one-bit time interval delay. The signal 21b passes both of the two delaying circuits 14a and 14b, which is a delayed signal 21b with two-bit time interval delay. These two signals 21a and 12b are multiplied by the multiplier 15a. The product or multiplied signal obtained by the multiplier 15a is multiplied by the multiplier 15b by the received signal 20b without passing through any delaying circuit, to generate a triplex product or multiplied signal 22b, which is then inputted to both of the comparator 16 for detecting the synchronizing signal and the S/P converter 19. On the other hand, in the second preferred embodiment, the delayed signal 21 obtained by passing through the one delaying circuit 14 is multiplied by the received signal 20b without passing through any delaying circuit, and then, the product or multiplied signal obtained from this multiplication is inputted to both of the comparator 16 and the S/P converter 19.

The second difference is that in the reception clock signal generator 17b, the time from synchronization detection to the first rise or leading edge of the reception clock signal is set to a time interval of three synchronizing bits plus a predetermined constant delay time. On the other hand, in the second preferred embodiment, this time is set to a time interval of two synchronizing bits plus the predetermined delay time.

The third difference is that a frequency divider 43b of the present preferred embodiment is a ⅓ frequency divider for sampling the signal 25 outputted from the reception clock signal generator 17b, every three-bit time interval. In the second preferred embodiment, the frequency divider 43a is a ½ frequency divider for sampling the signal 24 outputted from the reception clock signal generator 17a every two-bit time interval.

Next, a relationship among the signals within the receiving apparatus will be described. FIG. 11 is a timing chart showing an operation of the receiving apparatus shown in FIG. 10B, and shows a relationship among the received signal 20b, delayed signals 21a and 21b, multiplied signal 22b, and so on. Each of the time intervals 30a to 30i shown in the timing chart of FIG. 11 represents the time interval for one bit.

Referring now to a waveform of the received signal 20b, signals 31a, 31b and 31c are synchronizing bit signals, respectively, and signals 32a, 45a, 81a, 32b, 45b and 81b are signals representing information data. Each of the signals 32a, 45a, 81a, and the signals 32b, 45b, 81b contains three bits of the same data. This is because the transmitting apparatus for the transmitting station transmits successive three synchronizing bit, as well as successive three bits of the same information bit. This waveform shows an example in which three bits of "1" are included in the signals 31a, 31b and 31c as the synchronizing bits, and information data of "0", "0", "0", "1", "1", and "1" are included respectively in the signals 32a to 81b. In this case, data bits, which the transmitting apparatus for the transmitting station wishes to transmit to the receiving apparatus for the receiving station, are "0" and "1". In other words, the transmitting station transmits three bits of the same data.

Signals 46a and 46b are noise signals respectively, which appear also as signals 47a and 47b in the waveform of the delayed signal 21a, and appear as signals 82a and 82b in the waveform of the delayed signal 21b. It should be noted here that each of these noise signals 46a and 46b has a peak value similar to those of the synchronizing bit waveform and data "1" waveform. In a manner similar to that of the timing chart shown in FIG. 9, the noise signals 46a and 46b are apart from each other by a time interval of one bit.

The delayed signal 21a outputted from the delaying circuit 14a has the same waveform as that of the received signal 20b, except for that the received signal 20b is translated rightward by the amount of one-bit time interval, where the time advances rightward. Further, the delayed signal 21b obtained by delaying the delayed signal 21a through the delaying circuit 14b has the same waveform as that of the delayed signal 21a, except for that the delayed signal 21a is translated rightward by the amount of one-bit time interval, namely, the delayed signal 20b is translated rightward by the amount of two-bit time interval.

Referring to the multiplied signal 22b which is the triplex product or multiplied signal of the received signal 20b, the delayed signal 21a and the delayed signal 21b, there is generated a signal 74 having a value exceeding the threshold value Th1 for the time interval 30c. In response to generation of the signal 74, the signal 75 is generated in the signal 24, which becomes a synchronization detection signal.

Further, upon reception of the synchronization detection signal, the reception clock signal generator 17b generates the reception clock signal 25, which rises every one-bit time interval from a timing point a predetermined constant delay time 39 after another timing point, which is three-bit time interval 38b after an leading edge of the signal 75 in the signal 24. The signal 25 is inputted to the ⅓ frequency divider 43b, and then, the frequency of the signal 25 is divided into ⅓ of the frequency of the signal 25 so as to generate a signal having ⅓ of the frequency of the signal 25. As a result, the signal 44, which rises every three-bit time interval from a timing point of three-bit time interval plus a predetermined constant delay time from another timing point of the synchronization detection. Therefore, the signal 44 has a waveform with a leading edge at each of the timing points 83a and 83b.

At each of the timing points 83a and 83b in the signal 44, the data of the signal 24 is sampled at each of the timing points 84a and 84b, and is decoded. Data decoded at timing points 85a and 85b gives values "0"and "1", being identical with a series of original data bits "0" and "1" included in the received transmission signal.

According to the present preferred embodiment, the same synchronization detection method as used in the fourth preferred embodiment is employed. However, the present invention is not limited to this. Any other synchronization detecting method may be used, as long as the transmitting station transmits three identical bits for every data bit, whereas the receiving station samples the triplex product or multiplied signal of the received signal, the delayed signal with one-bit time interval delay, and the delayed signal with two-bit time interval delay, and then sampled signal is decoded based on the sample signal.

According to the present preferred embodiment, the transmitted signals attached with successive three bits of the synchronizing signal are received by the reception circuit, the signal thus received is delayed by the amount of time interval between two synchronizing signals to generate the first delayed signal, and then, the first delayed signal is further delayed by an additional amount of the time interval between the two synchronizing signals to generate the second delayed signal. The first delayed signal, the second delayed signal and the received signal are multiplied to generate the multiplied signal, and the information signal is decoded based on the multiplied signal. With the above arrangement, it becomes possible to correctly decode the information signal even if the noise signal (pulse) exists at a timing point where an information signal is to be generated and if another noise signal exists apart from the noise signal by a time interval between the two information signals.

According to the present preferred embodiment, the transmitting apparatus for the transmitting station transmits the same three synchronizing bits, and the receiving apparatus for the receiving station generates a triplex product or multiplied signal of the received signal, the delayed signal with one-bit time interval delay and another delayed signal with two-bit time interval delay. Thereafter, data is decoded based on the sampled values after the triplex product signal is sampled at the three bits time interval. However, the present invention is not limited to this. For example, the transmitting apparatus for the transmitting station may transmit n bits of the synchronizing bit (n is an integer, and $n \geq 4$). In such a case, the receiving apparatus for the receiving station generates a series of delayed signals with successively increasing delay, starting from one-bit time interval delay to (n−1)-bit time interval delay, with an increment of one-bit time interval. The receiving apparatus for the receiving station may multiply all of these delayed signals and the received signal to generate an n-plex product signal, and then data may be decoded based on sampled values which are obtained by sampling the n-plex product signal at n-bit time interval.

In this case, correct decoding is possible even if three or more noise signals having time differences each of one-bit time interval superimposed on the information bit, and the peak value of the noise signals have a level similar to that of the synchronizing signal, as long as the number of noise signals is not greater than n−1.

In the above-mentioned receiving apparatus of the present preferred embodiment, the serial signal may preferably includes the following signals:

(a) a plurality of first signals, each of which is the synchronizing signal, which are the same as each other, and which are apart from each other by a predetermined time interval; and (b) a plurality of second signals, each of which is the information signal, which are the same as each other, and which are apart from each other by the predetermined time interval, In this case, the multiplying circuit generates a first multiplied signal by multiplying the synchronizing signal of the received signal by at least one delayed signal of the synchronizing signal based on the plurality of first signals, and generates a second multiplied signal by multiplying the information signal of the received signal by at least one delayed signal of the information signal based on the plurality of second signals. Then the detecting circuit detects the synchronizing signal based on the first multiplied signal, and detects the information signal from the second multiplied signal based on the detected synchronizing signal. Accordingly, not only the synchronizing signal but also the information signal can be correctly detected or decoded even with presence of a noise signal, without significant decrease in transmission speed.

Sixth Preferred Embodiment

Figure 12:
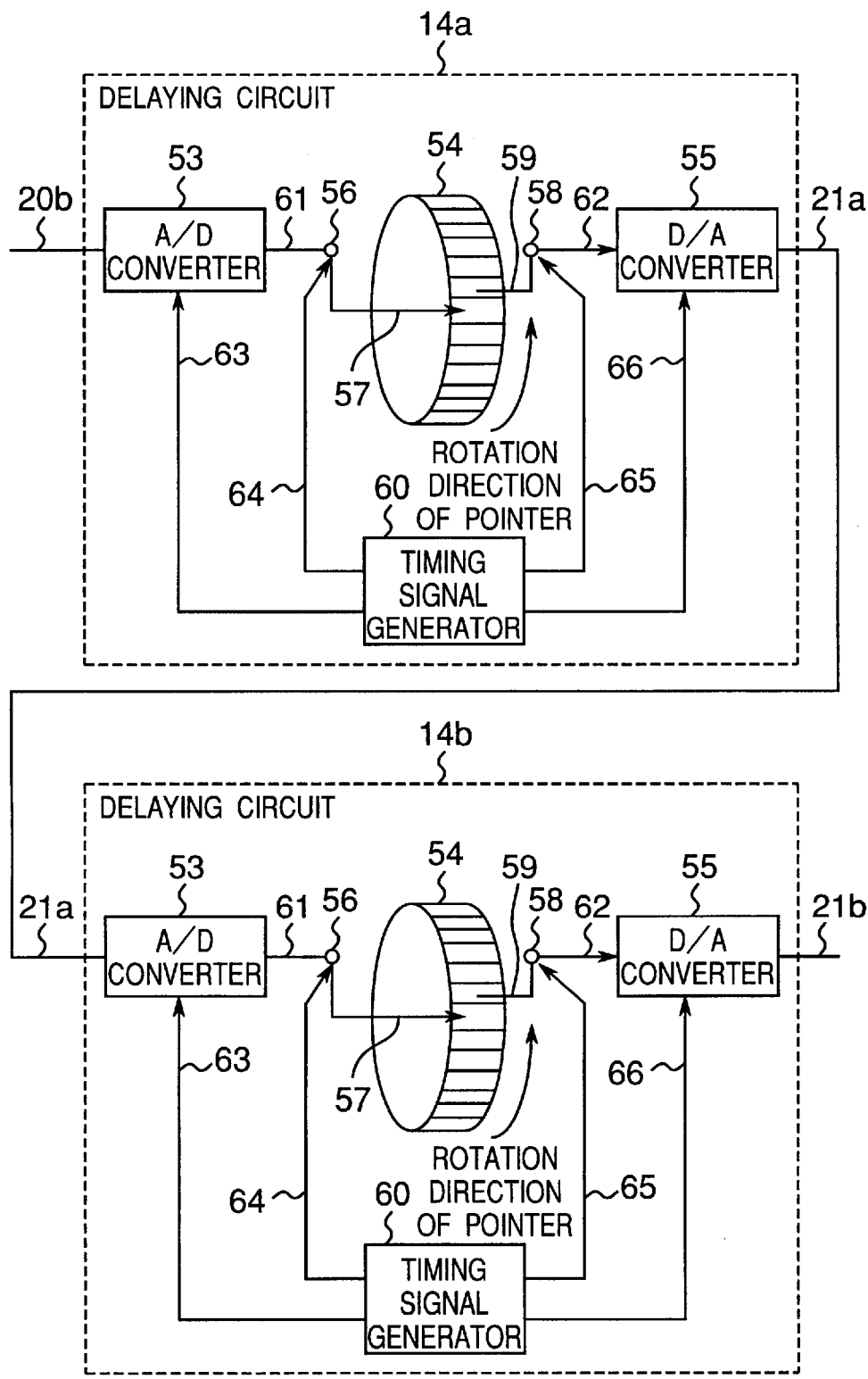
FIG. 12 is a block diagram showing delaying circuits 14*a* and 14*b* of a sixth preferred embodiment according to the present invention.

A delaying circuit according to the present preferred embodiment is applied to the delaying circuits 14a and 14b in each of the fourth and fifth preferred embodiments, and comprises a plurality of delaying circuits 14a used in the third preferred embodiment shown in FIG. 5, where the plurality of delaying circuit 14a are connected in series. FIG. 12 is a block diagram showing a configuration of the delaying circuits 14a and 14b of the sixth preferred embodiment.

Referring now to FIG. 12, the delaying circuits 14a and 14b correspond to the delaying circuits 14a and 14b used in the fifth preferred embodiment shown in FIG. 10B. Further, an input signal 20b and an output signal 21a to and from the delaying circuit 14a correspond to the received signal 20b and delayed signal 21a shown in FIGS. 7 and 10, respectively. Further, an input signal 21a and an output signal 21b to and from the delaying circuit 14b correspond to the delayed signal 21a and 21b shown in FIGS. 7 and 10, respectively. The output signal 21a from the delaying circuit 14a serves as the input signal 21a via a wire connection. Each of the delaying circuits 14a and 14b has an identical internal configuration and function with those of the delaying circuit 14 described in the third preferred embodiment, and therefore will not be further detailed.

The above is description of a preferred embodiment of a delaying circuit for generating a delayed signal with delay of two-bit time interval. A delaying circuit for generating a delayed signal with the delay of n-bit time interval (n is an integer, and $n \geq 3$), can be realized by serially connecting n units of the above delaying circuit each capable of delaying by one-bit time interval.

Seventh Preferred Embodiment

Even with the arrangement described in the fourth preferred embodiment, a specific pattern of noise inclusion may cause the receiving apparatus to fail in correct synchronization detection. Description will be made now for a method capable of performing the synchronization detection even in such a pattern of noise inclusion.

Before describing the above method, it should be worthwhile to see a timing chart in FIG. 13, which shows a case where correct synchronization detection cannot be made by the method according to the fourth preferred embodiment, and shows a problem operation which can be dissolved in a seventh preferred embodiment according to the present invention. Signals shown in FIG. 13 are essentially the same as those in FIG. 8 used for describing the fourth preferred embodiment, except that the noise signals 33a and 33b shown in FIG. 8 are not included in the received signal 20b, but a noise signal 33c is included exactly one-bit time interval before the synchronizing signal 31a. It should be noted that the noise signal 33c has a peak value similar to that of the synchronizing signals 31a to 31c and that of the signals 32d to 32f representing a bit data "1".

The only one noise signal 33c is included exactly one-bit time interval before the synchronizing signal 31a. This causes generation of a signal 86 at a timing point 85 in the multiplied signal 22b of FIG. 13, which in turn causes generation of a signal 87 in the signal 24. Therefore, this leads to generation of a leading edge of the signal 87 prior to the signal 75 which should be an original synchronization detection signal, and then this causes failure in the synchronization detection.

As a result, data of the signal 27 at the timing points 89a, 89b, . . . , 89e are sampled respectively at each of a leading edge 88a, 88b, . . . , 88e of the signal 25, and then the sampled data are decoded. As a result, the data at the timing points 90a, 90b, . . . , 90e may be decoded into bit data containing "1", "0", "0", "0", and "1", being respectively different from the original information data "0", "0", "1", "1", and "1".

Figure 14A:
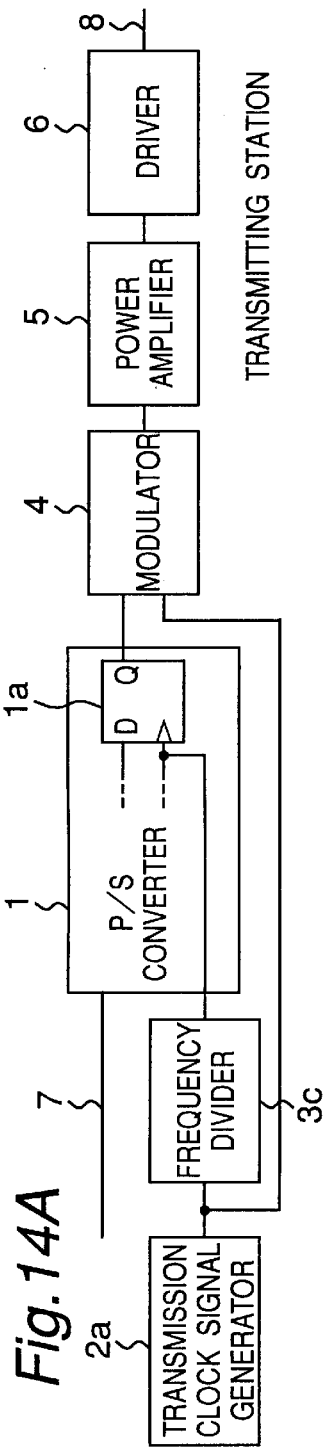
FIG. 14A is a block diagram showing a configuration of a transmitting apparatus for a transmitting station of a communication system of the seventh preferred embodiment according to the present invention.
Figure 14B:
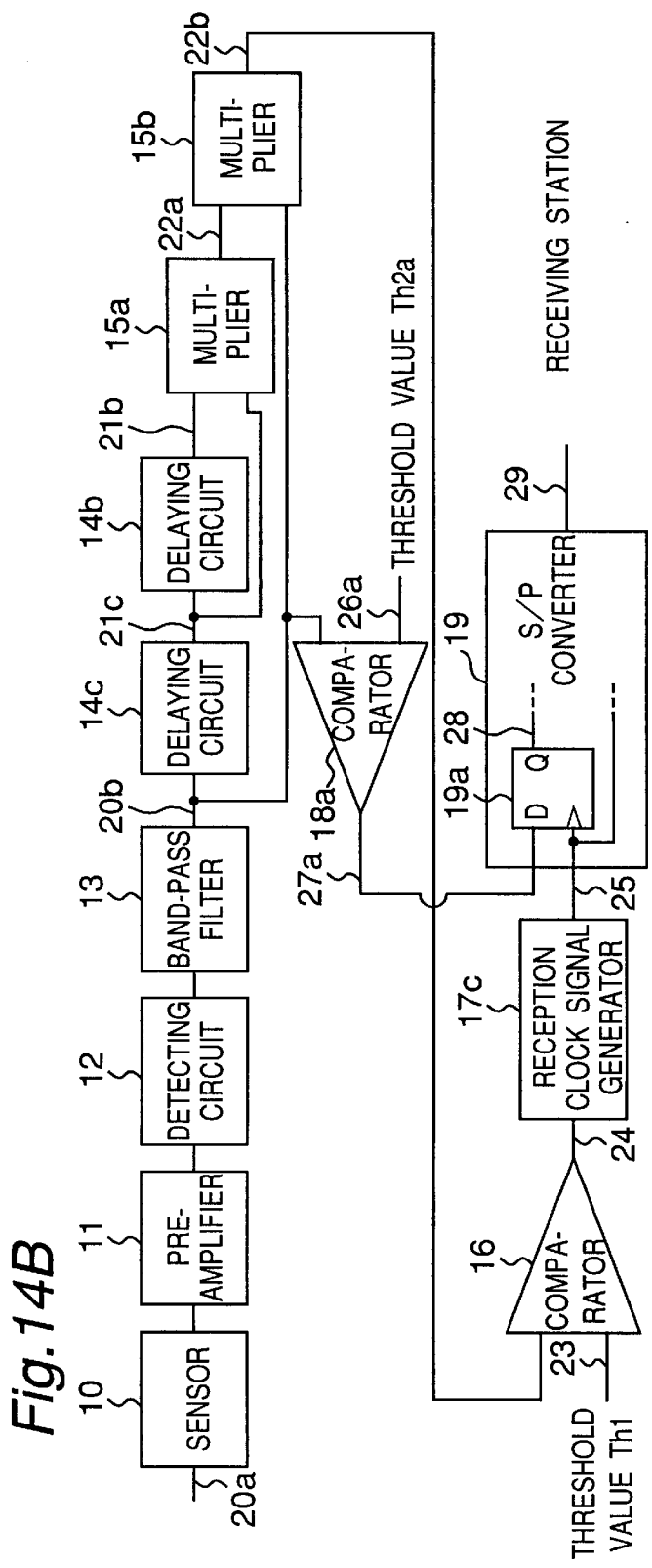
FIG. 14B is a block diagram showing a configuration of a receiving apparatus for a receiving station of the communication system of the seventh preferred embodiment according to the present invention.

FIG. 14A is a block diagram showing a configuration of a transmitting apparatus for a transmitting station of a communication system of the seventh preferred embodiment according to the present invention, and FIG. 14B is a block diagram showing a configuration of a receiving apparatus for a receiving station of the communication system of the seventh preferred embodiment.

The transmitting apparatus for the transmitting station of the present preferred embodiment differs from that of the fourth preferred embodiment in that a transmission clock signal generator 2a operates in a different manner from the transmission clock signal generator 2 of the fourth preferred embodiment shown in FIG. 7A. Specifically, when transmitting the synchronizing bit, a time interval between the first and second synchronizing signals (hereinafter referred to as a first synchronization bit interval) differs from a time interval between the second and third synchronizing signals (hereinafter referred to as a second synchronization bit interval). It should be noted here that according to the present preferred embodiment, the second synchronization bit interval is set to one-bit time interval whereas the first synchronization bit interval is set to 0.6-bit time interval.

The receiving apparatus for the receiving station differs from that of the fourth preferred embodiment in the following three differences.

The first difference is that a delay time of a delay circuit 14c is 0.6 times the delay time of the delaying circuit 14b. On the other hand, in the fourth preferred embodiment shown in FIG. 7B, the delay time of the delaying circuit 14a is identical with the delay time of the delay circuit 14b.

The second difference is that an input signal to the comparator 18a for detecting the information signal is the received signal 20b which is not passed through any delaying circuit. On the other hand, in the fourth preferred embodiment shown in FIG. 7B, the signal which have been passed through the delaying circuits 14a and 14b of two stages is inputted to the comparator 18.

The third difference is that in an operation of a reception clock signal generator 17c, the time from the synchronization detection to the first rise or leading edge of the reception clock signal is set to a time interval of one-bit time interval plus a predetermined constant delay time. On the other hand, in the fourth preferred embodiment shown in FIG. 7B, the time from the synchronization detection to the first rise or leading edge of the reception clock signal is set to a time interval of three-bit time interval plus the predetermined constant delay time. In a manner similar to that of the fourth preferred embodiment, the reception clock signal generator 17c of the present preferred embodiment generates a reception clock which rises every one-bit time interval from the first leading edge of the reception clock signal.

Figure 15:
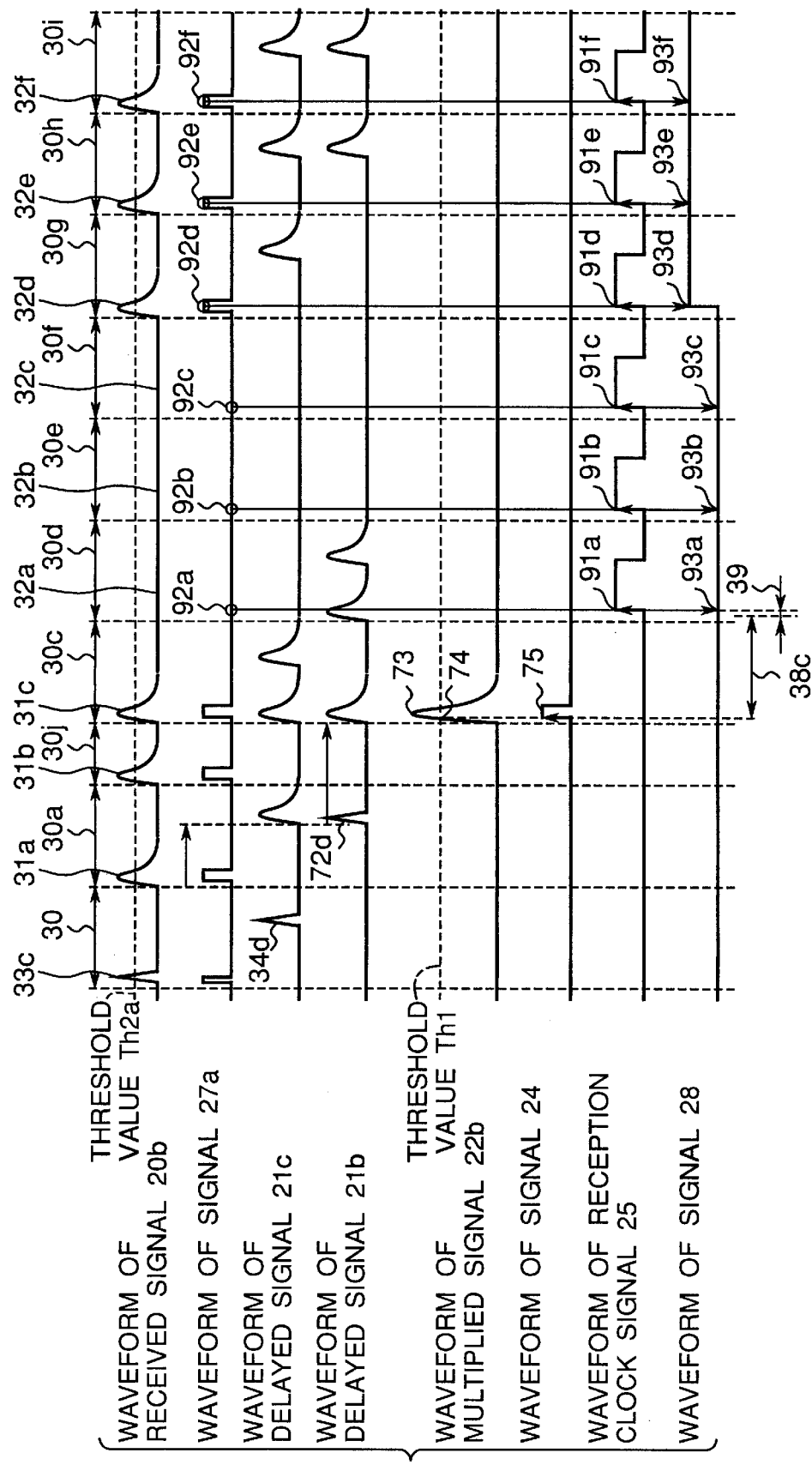
FIG. 15 is a timing chart showing an operation of the receiving apparatus shown in FIG. 14B.

Next, a relationship among the signals within the receiving apparatus will be described. FIG. 15 is a timing chart showing an operation of the receiving apparatus shown in FIG. 14B, and shows a relationship among the received signal 20b, delayed signals 21c and 21b, multiplied signal 22b and so on. Each of the time intervals 30, 30a, 30c to 30i shown in the timing chart of FIG. 15 represents a time interval for one bit. A time interval 30j represent a time interval which is 0.6 times the one-bit time interval.

Referring now to a waveform of the received signal 20b, the signals 31a to 31c are the synchronizing bit signals, respectively, and the signals 32a to 32f are signals representing information data. This waveform shows an example in which three bits of "1" are included as the synchronizing signals, and information data, "0", "0", "0", "1", "1" and "1" are included respectively in an order of the signals 32a to 32f.

Further, a signal 33c is a noise signal, which appears also as a signal 72d in a waveform of the delayed signal 21b. It should be noted here that the noise signal 33c has a peak value similar to that of the synchronizing signals 31a to 31c, and that of the signals 32d to 32f each representing the bit data "1". The noise signal 33c is generated at a position shown in FIG. 13.

FIG. 15 shows that the signal 27a has a waveform when the received signal 20b and a signal having the threshold value Th2a are inputted to a comparator 18a. The delayed signal 21c outputted from the delaying circuit 14c has the same waveform as that of the received signal 20b, except for that the received signal 20b is translated rightward by an amount of 0.6-bit time interval. Further, the delayed signal 21b obtained by passing the signal 21c through the delaying circuit 14b has the same waveform as that of the delayed signal 21a, except for that the delayed signal 21c is translated rightward by the amount of one-bit time interval, namely, that the received signal 20b is translated rightward by the amount of 1.6-bit time interval.

Referring to the multiplied signal 22b which is a triplex product signal of the received signal 20b, the delayed signal 21c and the delayed signal 21b, the signal 74 is generated having a value exceeding the threshold value Th1 at a timing point 73 for a time interval 30c, and then in accordance with generation of the signal 74, a signal 75 is generated in the signal 24, which becomes a synchronization detection signal.

Upon reception of the synchronization detection signal 75, the reception clock signal generator 17c generates a reception clock signal 25, which rises every one-bit time interval from a timing point a predetermined constant delay time 39 after another timing point which is one-bit time interval 38c after from the leading edge of the signal 75 in the signal 24. Therefore, the signal 25 has a waveform which rises at each of the timing points 91a, 91b, 91c, 91d, 91e and 91f.

At each of the timing points 91a, 91b, 91c, 91d, 91e and 91f of the signal 25, data of the signal 27a is sampled at each of the timing points 92a, 92b, 92c, 92d, 92e and 92f, and then sampled data are decoded. The decoded data give values "0", "0", "0", "1", "1" respectively at timing points 93a, 93b, 93c, 93d, 93e and 93f, being identical with a series of data bits "0", "0", "0", "1", "1" and "1" included in the received signal.

According to the present preferred embodiment, the first synchronization bit interval is set to 0.6 times the second synchronization bit interval. However, the present invention is not limited to this. For example, the first synchronizing bit interval may be greater than the second synchronizing bit interval, or the first synchronizing bit interval may be exactly one-bit time interval whereas the second synchronizing bit interval may be shorter or longer than that of the first synchronizing bit interval, or the like, as long as the first synchronizing bit interval has a different time length from that of the second synchronizing bit interval.

According to the present preferred embodiment, the first synchronizing bit interval and the second synchronization interval are different from each other in the synchronizing signal of the fourth preferred embodiment. As a result, it becomes possible to correctly detect the synchronizing signal even if the nose signal exists ahead of the first synchronizing bit signal by a time interval equal to the time interval between the synchronizing bits.

According to the present preferred embodiment, the transmitting apparatus for the transmitting station transmits three bits of the synchronizing bit. However, the present invention is not limited to this. For example, the transmitting apparatus for the transmitting station may transmit n bits of the synchronizing bit (n is an integer, and n≧4). In such a case, a time interval between a pair of adjacent synchronizing bits may be differed from a time interval between another pair of adjacent synchronizing bits. In this case, at least one time-interval between a pair of adjacent synchronizing bits may be differed from a time interval between the other pairs of adjacent synchronizing bits, or a plurality of different time intervals may be set therebetween.

Eighth Preferred Embodiment

Delaying circuits according to the present preferred embodiment is applied to the delaying circuits 14c and 14d of the seventh preferred embodiments shown in FIG. 14B, and is constituted essentially by replacing the delaying circuit 14a of the delaying circuits 14a and 14b of the sixth preferred embodiment shown in FIG. 12, with a delaying circuit 14c for another delay time deferring from the delay time achieved by the delaying circuit 14b.

Figure 16:
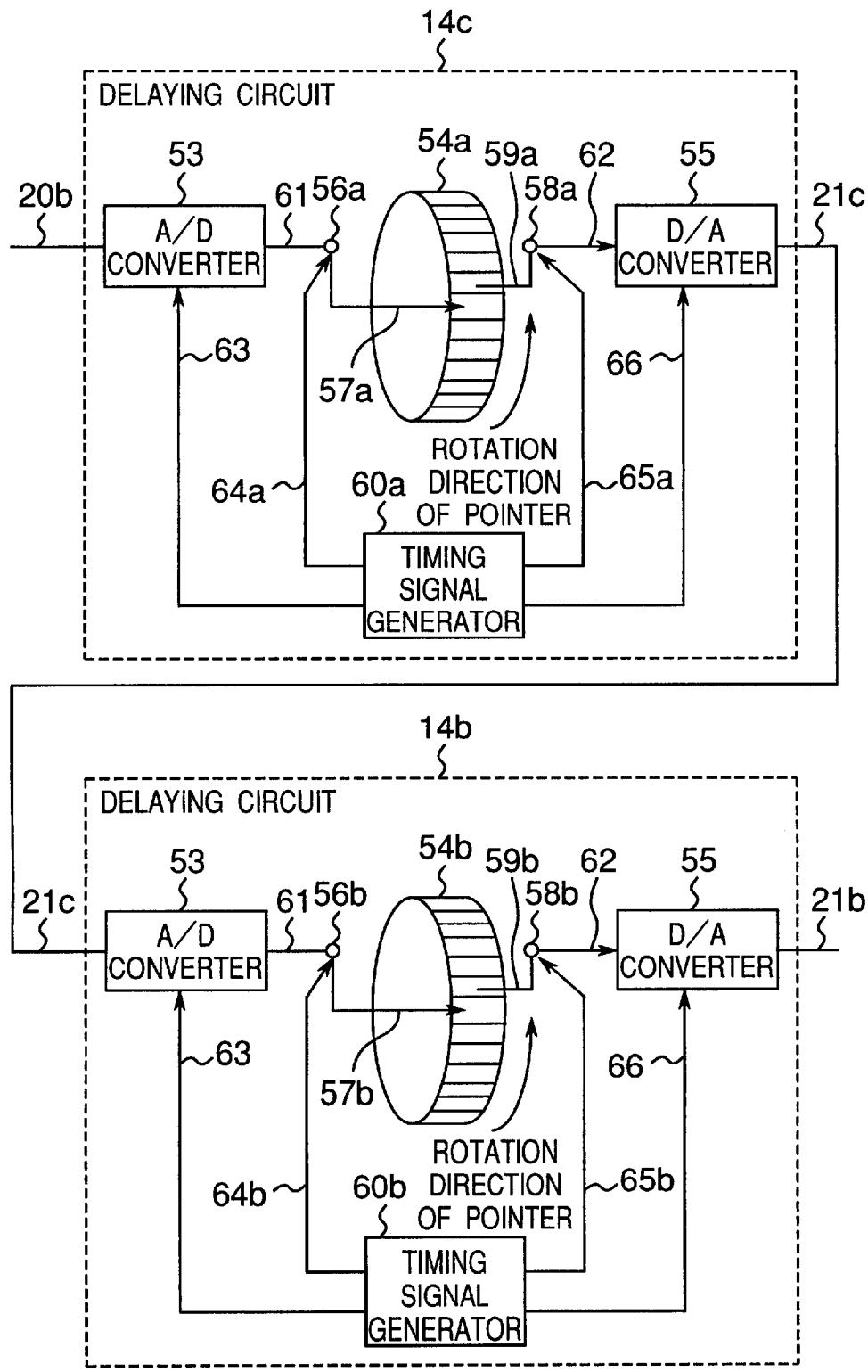
FIG. 16 is a block diagram showing delaying circuits 14*c* and 14*b* of an eighth preferred embodiment according to the present invention.

FIG. 16 is a block diagram showing a configuration of delaying circuits 14c and 14d of the present eighth preferred embodiment.

Referring to FIG. 16, The delaying circuits 14c and 14b shown in FIG. 16 correspond to the delaying circuits 14c and 14b shown in FIG. 14B, respectively. Further, an input signal 20b and an output signal 21c to and from the delaying circuit 14c correspond to the received signal 20b and the delayed signal 21c shown in FIG. 14B. Further, an input signal 21c and an output signal 21b to and from the delaying circuit 14b correspond to the delayed signal 21c and 21b shown in FIG. 14B. In the preferred embodiment, the output signal 21c from the delaying circuit 14c serves as the input signal 21c to the delaying circuit 14b via a wire connection.

Each of the delaying circuits 14c and 14d has an identical internal configuration and function with those of the corresponding delaying circuit described in the third preferred embodiment. A difference therebetween, however, is that the number L of samples stored in a memory 54a differs from the number M of samples stored in a memory 54b. An address indicated by a storing address pointer 57a of the memory 54a is switched over in an order of 1, 2, . . . , L, 1, 2, . . . by a switch 56a, whereas an address indicated by a storing address pointer 55b of the memory 52b is switched over in an order of 1, 2, . . . , M, 1, 2, . . . by a switch 56b.

Further, the reading address pointer 57a indicates an address which was indicated by the storing address pointer 57a L times ago, whereas the reading address pointer 57b indicates an address which was indicated by the storing address pointer 57b M times ago. The other basic operations are the same as those in the sixth preferred embodiment shown in FIG. 12.

According to the present preferred embodiment, the delaying circuit is constituted for such a case in which the number of the synchronizing bits is three. For n bits of the synchronizing bit (n is an integer, and n≧4), n−1 units of the delaying circuits each storing different numbers of samples should be provided in a serial connection.

Advantageous Effects of Preferred Embodiments

According to the preferred embodiments of the present invention, there is provided a receiving apparatus for receiving a serial signal composed of a sequence of signals transmitted through a transmission medium, comprising:

a receiving circuit for receiving as a received signal a serial signal, which is a sequence of signals including at least one of a synchronizing signal and an information signal, and which includes a plurality of signals being the same as each other and being apart from each other by a predetermined time interval;

a delaying circuit for generates a delayed signal by delaying the received signal received by the receiving circuit by the predetermined time interval;

a multiplying circuit for generating a multiplied signal by multiplying the received signal by the delayed signal; and a detecting circuit for detecting at least one of the synchronizing signal and the information signal, based on the multiplied signal.

Accordingly, the receiving apparatus according to the preferred embodiments of the present invention can correctly detects or decode at least one of the synchronizing signal and the information signal even with presence of a noise signal, without significant decrease in transmission speed.

In the above-mentioned receiving apparatus, each of the plurality of signals is preferably the synchronizing signal, and the detecting circuit detects the synchronizing signal based on the multiplied signal. Further, the detecting circuit preferably detects the information signal from the received signal, based on the detected synchronizing signal. Accordingly, the synchronizing signal and the information signal can be correctly detected even if the noise signal (pulse) exists before the synchronizing signal. Further, there is no significant decrease in transmission speed since the transmission can be made in a minimum necessary pulse width comprising two bits of the synchronizing signal followed by transmitting the information signal bit by bit.

In the above-mentioned receiving apparatus, each of the plurality of signals is preferably the information signal, and the detecting circuit detects the information signal based on the multiplied signal. Accordingly, the information signal can be correctly detected even if the noise signal (pulse) exists before the information signal.

In the above-mentioned receiving apparatus, the plurality of signals preferably include first, second and third signals being the same as each other and being apart from each other by predetermined time intervals. The delaying circuit generates a first delayed signal by delaying the received signal by a time interval equal to a time interval between the first and third signals, and generates a second delayed signal by delaying the received signal by a time interval equal to a time interval between the second and third signals. Then the multiplying circuit generates a multiplied signal by multiplying the first and second delayed signals by the received signal. Accordingly, the information signal can be correctly decoded even if there is a noise signal (pulse) included before the signal and if there is another noise signal apart from the other noise signal by a time interval equal to the time interval between the two signals, without significant decrease in transmission speed.

In the above-mentioned receiving apparatus, each of the first signal, the second signal and the third signal is preferably the synchronizing signal, and the detecting circuit detects the synchronizing signal based on the multiplied signal. Further, the detecting circuit preferably detects the information signal from the received signal, based on the detected synchronizing signal. Accordingly, the synchronizing signal can be correctly decoded even if there is a noise signal (pulse) included before the synchronizing signal and if there is another noise signal apart from the other noise signal by a time interval equal to the time interval between two synchronizing signals. Still further, there is no significant decrease in transmission speed since the transmission can be made in a minimum necessary pulse width comprising the three bits of synchronizing signals followed by transmitting the information signals bit by bit.

In the above-mentioned receiving apparatus, the time interval between the first and second signals is different from the time interval between the second and third signals. Accordingly, it becomes possible to correctly detect the synchronizing signal even if the noise signal exists before the first synchronizing signal by a time interval equal to the time interval between two adjacent synchronizing signals.

In the above-mentioned receiving apparatus, the serial signal preferably includes the following signals:

(a) a plurality of first signals, each of which is the synchronizing signal, which are the same as each other, and which are apart from each other by a predetermined time interval; and (b) a plurality of second signals, each of which is the information signal, which are the same as each other, and which are apart from each other by the predetermined time interval, wherein the multiplying circuit generates a first multiplied signal by multiplying the synchronizing signal of the received signal by at least one delayed signal of the synchronizing signal based on the plurality of first signals, and generates a second multiplied signal by multiplying the information signal of the received signal by at least one delayed signal of the information signal based on the plurality of second signals, and wherein the detecting circuit detects the synchronizing signal based on the first multiplied signal, and detects the information signal from the second multiplied signal based on the detected synchronizing signal.

Accordingly, not only the synchronizing signal but also the information signal can be correctly detected or decoded even with presence of a noise signal, without significant decrease in transmission speed.

In the above-mentioned receiving apparatus, the delaying circuit preferably comprises:

an A/D converter for converting the analog received signals into digital signals;

a digital memory for sequentially storing digital signals converted by the A/D converter;

a D/A converter for converting the digital signals stored in the digital memory into analog signals; and a timing generator for generating timing signals for controlling the A/D converter, the digital memory and the D/A converter to delay the analog received signals by the predetermined time interval and output the delayed signals.

Accordingly, it becomes possible to successively store signals from the A/D converter to the digital memory while at the same time successively taking signals stored in the digital memory, making possible to generate delayed signal with a long delay time.

Further, according to the preferred embodiments of the present invention, there is provided a communication system comprising:

a transmitting apparatus for transmitting a serial signal, which is a sequence of signals including at least one of a synchronizing signal and an information signal, and which includes a plurality of signals being the same as each other and being apart from each other by a predetermined time interval; and a receiving apparatus for receiving the serial signal transmitted by the transmitting apparatus through a transmission medium, and wherein the receiving apparatus comprises:

a receiving circuit for receiving the serial signal as a received signal;

a delaying circuit for generates a delayed signal by delaying the received signal received by the receiving circuit by the predetermined time interval;

a multiplying circuit for generating a multiplied signal by multiplying the received signal by the delayed signal; and a detecting circuit for detecting at least one of the synchronizing signal and the information signal, based on the multiplied signal.

Accordingly, at least one of the synchronizing signal and the information signal can be correctly decoded even with presence of a noise signal, without significant decrease in transmission speed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A receiving apparatus for receiving a serial signal composed of a sequence of signals transmitted through a transmission medium, comprising:

a receiving circuit for receiving as a received signal a serial signal, which is a sequence of signals including a synchronizing signal and an information signal, and which includes a plurality of signals being the same as each other and being apart from each other by a predetermined time interval;

a delaying circuit for generates a delayed signal by delaying said received signal received by said receiving circuit by said predetermined time interval;

a multiplying circuit for generating a multiplied signal by multiplying said received signal by said delayed signal; and a detecting circuit for detecting the synchronizing signal and the information signal, based on the multiplied signal.

2. The receiving apparatus according to claim 1,
wherein said plurality of signals include first, second and third signals being the same as each other and being apart from each other by predetermined time intervals,
wherein said delaying circuit generates a first delayed signal by delaying said received signal by a time interval equal to a time interval between the first and third signals, and generates a second delayed signal by delaying said received signal by a time interval equal to a time interval between the second and third signals, and
wherein said multiplying circuit generates a multiplied signal by multiplying the first and second delayed signals by said received signal.

3. The receiving apparatus according to claim 2,
wherein each of the first signal, the second signal and the third signal is the synchronizing signal, and
wherein said detecting circuit detects the synchronizing signal based on the multiplied signal.

4. The receiving apparatus according to claim 3,
wherein said detecting circuit detects the information signal from said received signal, based on said detected synchronizing signal.

5. The receiving apparatus according to claim 2,
wherein the time interval between the first and second signals is different from the time interval between the second and third signals.

6. The receiving apparatus according to claim 1,
wherein said serial signal includes the following signals:
   (a) a plurality of first signals, each of which is the synchronizing signal, which are the same as each other, and which are apart from each other by a predetermined time interval; and
   (b) a plurality of second signals, each of which is the information signal, which are the same as each other, and which are apart from each other by the predetermined time interval,
   wherein said multiplying circuit generates a first multiplied signal by multiplying the synchronizing signal of said received signal by at least one delayed signal of said synchronizing signal based on said plurality of first signals, and generates a second multiplied signal by multiplying the information signal of said received signal by at least one delayed signal of said information signal based on said plurality of second signals, and
   wherein said detecting circuit detects the synchronizing signal based on said first multiplied signal, and detects the information signal from said second multiplied signal based on said detected synchronizing signal.

7. The receiving apparatus according to claim 1,
wherein said delaying circuit comprises:
   an A/D converter for converting the analog received signals into digital signals;
   a digital memory for sequentially storing digital signals converted by said A/D converter;
   a D/A converter for converting the digital signals stored in said digital memory into analog signals; and
   a timing generator for generating timing signals for controlling said A/D converter, said digital memory and said D/A converter to delay the analog received signals by said predetermined time interval and output delayed signals.

8. A communication system comprising:
a transmitting apparatus for transmitting a serial signal, which is a sequence of signals including a synchronizing signal and an information signal, and which includes a plurality of signals being the same as each other and being apart from each other by a predetermined time interval; and
a receiving apparatus for receiving the serial signal transmitted by the transmitting apparatus through a transmission medium, and
wherein said receiving apparatus comprises:
   a receiving circuit for receiving the serial signal as a received signal;
   a delaying circuit for generates a delayed signal by delaying said received signal received by said receiving circuit by said predetermined time interval;
   a multiplying circuit for generating a multiplied signal by multiplying said receiving signal by said delayed signal; and
   a detecting circuit for detecting the synchronizing signal and the information signal, based on the multiplied signal.

9. The communication system according to claim 8,
wherein said plurality of signals include first, second and third signals being the same as each other and being apart from each other by predetermined time intervals,
wherein said delaying circuit generates a first delayed signal by delaying said received signal by a time interval equal to a time interval between the first and third signals, and generates a second delayed signal by delaying said received signal by a time interval equal to a time interval between the second and third signals, and
wherein said multiplying circuit generates a multiplied signal by multiplying the first and second delayed signals by said received signal.

10. The communication system according to claim 9,
wherein each of the first signal, the second signal and the third signal is the synchronizing signal, and
wherein said detecting circuit detects the synchronizing signal based on the multiplied signal.

11. The communication system according to claim 10,
wherein said detecting circuit detects the information signal from said received signal, based on said detected synchronizing signal.

12. The communication system according to claim 9,
wherein the time interval between the first and second signals is different from the time interval between the second and third signals.

13. The communication system according to claim 8,
wherein said serial signal includes the following signals:
   (a) a plurality of first signals, each of which is the synchronizing signal, which are the same as each other, and which are apart from each other by a predetermined time interval; and
   (b) a plurality of second signals, each of which is the information signal, which are the same as each other, and which are apart from each other by the predetermined time interval, wherein said multiplying circuit generates a first multiplied signal by multiplying the synchronizing signal of said received signal by at least one delayed signal of said synchronizing signal based on said plurality of first signals, and generates a second multiplied signal by multiplying the information signal of said received signal by at least one delayed signal of said information signal based on said plurality of second signals, and wherein said detecting circuit detects the synchronizing signal based on said first multiplied signal, and detects the information signal from said second multiplied signal based on said detected synchronizing signal.

14. The communication system according to claim 8, wherein said delaying circuit comprises:
an A/D converter for converting the analog received signals into digital signals;
a digital memory for sequentially storing digital signals converted by said A/D converter;
a D/A converter for converting the digital signals stored in said digital memory into analog signals; and
a timing generator for generating timing signals for controlling said A/D converter, said digital memory and said D/A converter to delay the analog received signals by said predetermined time interval and output delayed signals.

* * * * *